US009507774B2

(12) United States Patent
Furihata et al.

(10) Patent No.: US 9,507,774 B2
(45) Date of Patent: Nov. 29, 2016

(54) SYSTEMS, METHOD AND PROGRAM PRODUCT FOR SPEECH TRANSLATION

(71) Applicant: KABUSHIKI KAISHA TOSHIBA, Minato-ku, Tokyo (JP)

(72) Inventors: Kentaro Furihata, Kawasaki (JP); Kazuo Sumita, Yokohama (JP); Satoshi Kamatani, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 62 days.

(21) Appl. No.: 14/493,533

(22) Filed: Sep. 23, 2014

(65) Prior Publication Data
US 2015/0095011 A1   Apr. 2, 2015

(30) Foreign Application Priority Data
Sep. 30, 2013   (JP) .................. 2013-205869

(51) Int. Cl.
G06F 17/28 (2006.01)
G06F 17/27 (2006.01)
G10L 15/26 (2006.01)

(52) U.S. Cl.
CPC .......... *G06F 17/289* (2013.01); *G06F 17/275* (2013.01); *G10L 15/26* (2013.01)

(58) Field of Classification Search
CPC .................................... G06F 17/289
USPC ............................................. 704/2
See application file for complete search history.

(56) References Cited

U.S. PATENT DOCUMENTS 5,854,997 A    12/1998  Sukeda et al.
6,175,819 B1*  1/2001   Van Alstine ............ 704/235
(Continued)

FOREIGN PATENT DOCUMENTS

JP    08-077176    3/1996
JP    08-278972    10/1996
(Continued)

*Primary Examiner* — Susan McFadden
(74) *Attorney, Agent, or Firm* — Amin, Turocy & Watson LLP

(57) ABSTRACT

According to one embodiment, a speech translation system includes a first terminal device including a first speech input unit for inputting a first speech of a first language spoken by a first user, and converting the first speech to a first speech signal; a second terminal device including a second speech input unit for inputting a second speech of a second language spoken by a second user, and converting the second speech to a second speech signal; a speech recognition device that receives the first speech signal and the second speech signal, recognizes the first speech signal to a first recognized text, and recognizes the second speech signal to a second recognized text; a machine translation device that receives the first recognized text and the second recognized text, translates the first recognized text to a first translated text of the second language, and translates the second recognized text to a second translated text of the first language; and a control device; wherein the first terminal device receives (a) a first text set of the first language being the first recognized text and the second translated text, and (b) a second text set of the second language being the second recognized text and the first translated text, and includes a first display unit that displays the first text set and the second text set; and the second terminal device receives at least one text of the second text set, and includes a second display unit that displays the at least one text of the second text set.

14 Claims, 23 Drawing Sheets

(56) References Cited

U.S. PATENT DOCUMENTS

| | | | |
|---|---|---|---|
| 7,460,884 B2 * | 12/2008 | Sinclair et al. | 455/556.1 |
| 7,830,408 B2 * | 11/2010 | Asthana et al. | 348/14.08 |
| 8,214,197 B2 * | 7/2012 | Kamatani et al. | 704/2 |
| 8,868,430 B2 * | 10/2014 | Burvall | G06F 17/289 704/277 |
| 2014/0006007 A1 | 1/2014 | Sumita et al. | |
| 2014/0242955 A1 * | 8/2014 | Kang et al. | 455/414.1 |

FOREIGN PATENT DOCUMENTS

| | | |
|---|---|---|
| JP | 2005-107595 | 4/2005 |
| JP | 2005-222316 | 8/2005 |
| JP | 2006-195686 | 7/2006 |
| JP | 3137700 | 11/2007 |
| JP | 2008-243222 | 10/2008 |
| JP | 2009-205579 | 9/2009 |
| JP | 2011-118690 | 6/2011 |
| JP | 2014-010623 | 1/2014 |

* cited by examiner

Fig. 22A

| Terminal device name | First terminal device | Second terminal device |
|---|---|---|
| Terminal ID | 1 | 2 |

| User name | Hanako | Jack |
|---|---|---|
| User ID | 1 | 2 |
| Language ID | JP | EN |

| Language name | Japanese | English |
|---|---|---|
| Language ID | JP | EN |

Fig. 22B

| | Terminal ID | | | | |
|---|---|---|---|---|---|
| | 1 | | 2 | | |
| | Speech input unit | Display unit | Speech input unit | Display unit | |
| User ID | 1 | Yes | Yes | No | No |
| | 2 | No | Yes | No | Yes |

Fig. 22C

| | Terminal ID | |
|---|---|---|
| | 1 | 2 |
| Language ID | JP | Yes | No |
| | EN | No | Yes |

Fig. 22D

| | Terminal ID | |
|---|---|---|
| | 1 | 2 |
| Language ID | JP | Yes | No |
| | EN | Yes | Yes |

| Dialogue ID | User ID | Recognize language ID | Recognized text | Recognition likelihood | Translation Language ID | Translated text | Reverse-translated text | Degree of coincidence | Second display flag |
|---|---|---|---|---|---|---|---|---|---|
| 1 | 1 | 1 | いらっしゃいませ！ | - | 2 | Welcome! | - | - | ON |
| 2 | 2 | 2 | I want to buy a mirror-less camera. | 1.0 | 1 | ミラーレスデジカメを買いたいのですが。 | I would like to buy a mirror-less digital camera. | 0.86 | ON |
| 3 | 1 | 1 | 少々お待ちを・・・ | - | 2 | Wait... | - | - | ON |
| 4 | 1 | 1 | このカメラですと、お子さんの笑顔の写真が綺麗に撮れますよ。 | - | 2 | By this camera, you can take your child's smile beautifully. | - | - | ON |
| 5 | 2 | 2 | Someday, when my daughter grow up, I want to show her the photos. | 1.0 | 1 | いつか・・・娘が大きくなったら、そのときの写真を見せてやりたいな。 | Someday, my daughter become large, I want to show the photos of that time. | 0.69 | ON |
| 6 | 1 | 1 | ちょっと値は張りますが。 | - | 2 | It's a bit expensive. | - | - | OFF |
| 7 | 1 | 1 | 大切な思い出はお金では買えませんからね。 | - | 2 | But precious memory is priceless. | - | - | ON |
| 8 | 1 | 2 | Thank you! I'll check it. | 1.0 | 1 | ありがとう！買ってみます。 | Thank you! I'll check it. | 1.0 | ON |
| 9 | 1 | 1 | お買物をお楽しみください。 | - | 2 | Enjoy your shopping! | - | - | OFF |

Fig. 23

SYSTEMS, METHOD AND PROGRAM PRODUCT FOR SPEECH TRANSLATION

CROSS REFERENCE TO RELATED APPLICATION

This application is based upon and claims the benefit of priority from Japanese Patent Application No. 2013-205869, filed on Sep. 30, 2013; the entire contents of which are incorporated herein by reference.

FIELD

Embodiments described herein relate generally to speech translation systems and associated methods.

BACKGROUND

With globalization of culture and economy in recent years, machine translation apparatuses have raised expectations for supporting communications between people speaking different languages. For now, application software of speech translation which is operated on mobile terminals (for example, smartphones), and Web-services which provide function of speech translation are in operation.

These speech translation systems are classified to the following two groups according to user's communication styles. The first system is a speech-exchange-type system in which a source language user speaks and a target language user hears the translation result. The second system is a display-combined-use-type system in which users confirm displays to read the recognized texts and the translated texts in order to check whether the user's speech is correctly processed, and then speak dialogues.

Unfortunately, it is impossible using available technology to perform speech recognition and machine translation without an error. Then, some feedback functions are needed. The feedback function shows users the recognition results and translation results which are not necessarily exact, since the users restate clearly, guess the intention of the other user's dialogue, and question.

Therefore, when users can see displays, the display-combined-use-type speech translation system is more reliable for the users, than the speech-exchange-type.

The display-combined-use-type speech translation systems are further classified to the following two groups according to user's browsing style in which users see what kind of size displays with whom.

The first system is a display-share-type system in which the users see the same display of one terminal device together and speak dialogues. The second system is an individual-screen-type system in which each user sees each display in respective terminals and speaks dialogues.

The problem with the display-share-type speech translation system is that, if some user's terminal device is shared by the other user, it is difficult for the other user to operate the terminal device.

Consider the case where the staff of a store and a foreign visitor who comes to the store, have dialogues, using the display-share-type simultaneous speech translation system (for example, tablet computer). The staff is experienced in operation of the tablet computer. But the first time visitor is not experienced in the operation. So it is difficult for the visitor to operate the tablet computer.

Similar problems exist in not only the operation of the display but also the way to input audio to a microphone. For example, the precision of the speech recognition is influenced by the volume of user's dialogue, the distance between a microphone and user's mouth, and the way in which a microphone is held by user's hand. Therefore, if the user is not experienced in using a microphone, the preciseness of speech recognition is likely to get worse.

In the above case, the staffs of the store can input their speeches to the tablet computer. On the other hand, it is difficult for the foreign visitors to input their speeches. Therefore, if the visitors have the terminal device (for example, smartphone) which they usually use, it is expected to realize improvement of preciseness in speech recognition in the system.

As explained above, Conventional display-share-type systems and individual-screen-type systems are not able to solve the above mentioned shortcomings.

In order to solve the above mentioned shortcomings, the speech translation system is required to consider (a) difference of display size in terminal devices, (b) a possibility of sharing the display of whether users see the same display together, and (c) an adaptability of user's experience of the speech input unit of the terminal device.

Especially recent years, the personal information terminal device having various forms (for example, smartphone and tablet computer) is quickly spreading. Thus solving above mentioned shortcomings is strongly desired in case of how various terminals are combined.

BRIEF DESCRIPTION OF THE DRAWINGS

FIGS. 22A to 22D show tables relating to terminals and users in a storage device 130.

FIG. 23 shows a table of dialogue history in the storage device 130.

DETAILED DESCRIPTION

According to one embodiment, a speech translation system includes a first terminal device including a first speech input unit for inputting a first speech of a first language spoken by a first user, and converting the first speech to a first speech signal; a second terminal device including a second speech input unit for inputting a second speech of a second language spoken by a second user, and converting the second speech to a second speech signal; a speech recognition device that receives the first speech signal and the second speech signal, recognizes the first speech signal to a first recognized text, and recognizes the second speech signal to a second recognized text; a machine translation device that receives the first recognized text and the second recognized text, translates the first recognized text to a first translated text of the second language, and translates the second recognized text to a second translated text of the first language; and a control device; wherein the first terminal device receives (a) a first text set of the first language being the first recognized text and the second translated text, and (b) a second text set of the second language being the second recognized text and the first translated text, and includes a first display unit that displays the first text set and the second text set; and the second terminal device receives at least one text of the second text set, and includes a second display unit that displays the at least one text of the second text set.

Various Embodiments of the speech translation system will be described hereinafter with reference to the accompanying drawings.

In one embodiment, systems and methods are described where the first language is Japanese and the second language is English. But directions of machine translation are not limited to the above case. The translation can be executed between any two or more languages or dialects.

Figure 1:
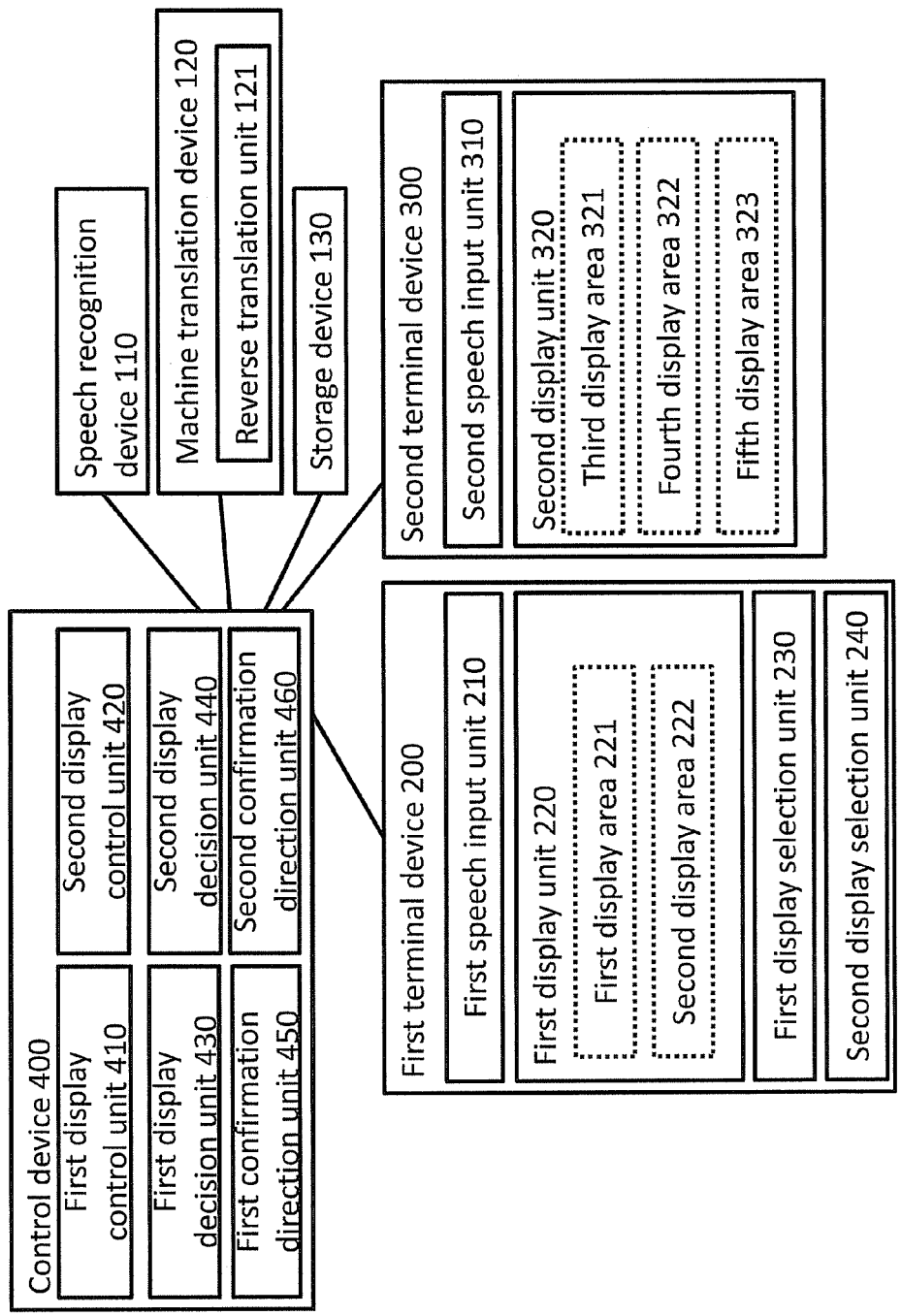
FIG. 1 shows a speech translation system of one embodiment.

FIG. 1 shows a speech translation system of one embodiment. The speech translation system includes a speech recognition device 110 receiving a first speech signal of a first language and a second speech signal of a second language directly or indirectly, and recognizing the first speech signal and the second speech signal to a first recognized text and a second recognized text, respectively; a machine translation device 120 receiving the first recognized text and the second recognized text from the device 110 directly or indirectly, and translating the first recognized text and the second recognized text to a first translated text of the second language and a second translated text of the first language, respectively, and having a reverse translation unit 121 translating the second translated text to a second reverse-translated text of the second language; a storage device 130; a first terminal device 200; a second terminal device 300; and a control device 400.

The device 130 stores a terminal information table, a user information table, a language information table, an utterance history table, a terminal usage table, a speech input language table, a display language table, and a dialog history table. These details will be described hereinafter with reference to the FIG. 22.

The device 200 includes a first speech input unit 210 inputting a first speech spoken by a first user of the first language (Japanese) and transforming the first speech into a first speech signal; a first display unit 220 having a first display area 221 displaying a first text set of the first language being the first recognized text and the second translated text, and a second display area 222 displaying a second text set of the second language being the second recognized text and the translated text; a first display selection unit 230 receiving a selection of text from the first text set and the second text set displayed on the unit 220; and a second display selection unit 240 receiving a selection of whether the area 222 is displayed on the unit 220.

The device 300 includes a second speech input unit 310 inputting a second speech spoken by a second user of the second language (English) and transforming the second speech into a second speech signal; and a second display unit 320 having a third display area 321 receiving at least one text of the second text set directly or indirectly and displaying the at least one text of the second text, a fourth display area 322 displaying a second recognized text corresponding to the latest utterance and the corresponded second reverse-translated text, and a fifth display area 323 displaying a text of the second language corresponding to the text of the first language displayed on the area 321.

The device 400 includes a first display control unit 410, a second display control unit 420, a first display decision unit 430, a second display decision unit 440, a first confirmation direction unit 450, and a second confirmation direction unit 460. In this case, the word "DIRECTLY" means that a plurality of devices are directly connected, or a plurality of software modules are implemented on one hardware, and the word "INDIRECTLY" means "through cable or wireless network".

Figure 2:
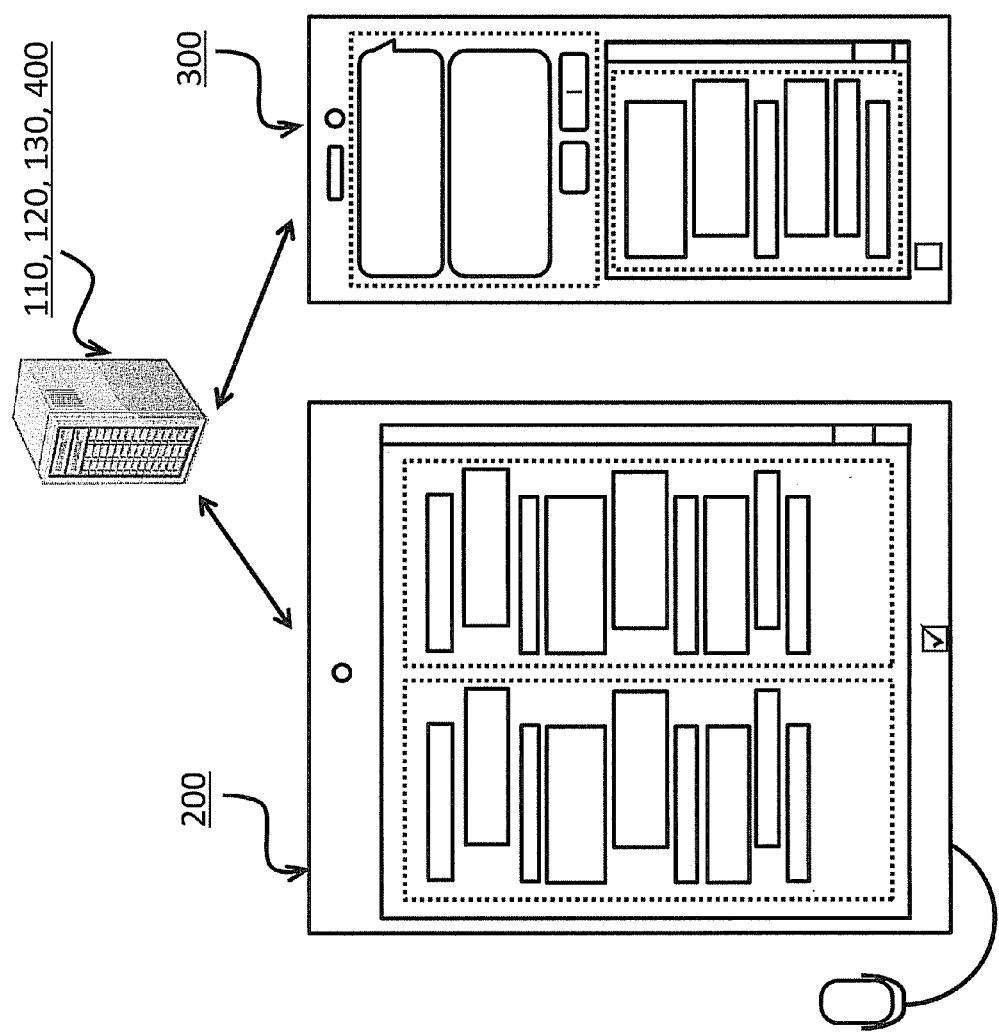
FIG. 2 shows the overview of the speech translation system.

FIG. 2 shows the overview of the speech translation system, when the device 200 is a tablet computer and the device 300 is smartphone computer which is smaller than the device 200.

The device 110, the device 120, the device 130 and the device 400 are included in one server. The device 200 and the device 300 communicate to this server through cable or wireless network. The device 130 can be built in the device 400.

A case of the device 200 has a touch-panel-display and a microphone. When the touch-panel-display is a capacitance-type-display, the device 200 has a pointing function detecting a area is pointed by touching the area by a user's finger and a display function displaying letters, pictures, and so on.

A case of the device 300 also has a touch-panel-display and a microphone. Since the display area of the device 300 is smaller than that of the device 200, the device 300 displays less information than the device 200.

For example, a first user (hereinafter, called Hanako) who is a Japanese speaker, inputs her speech in a microphone of the device 200 (tablet computer), and a second user (hereinafter, called Jack) who is a English speaker, inputs his speech in a microphone of the device 300 (smartphone). Hanako and Jack have an interactive dialogue seeing a big display of the device 200 (tablet computer). They input their speech in microphones of each device 200 or 300.

Figure 3:
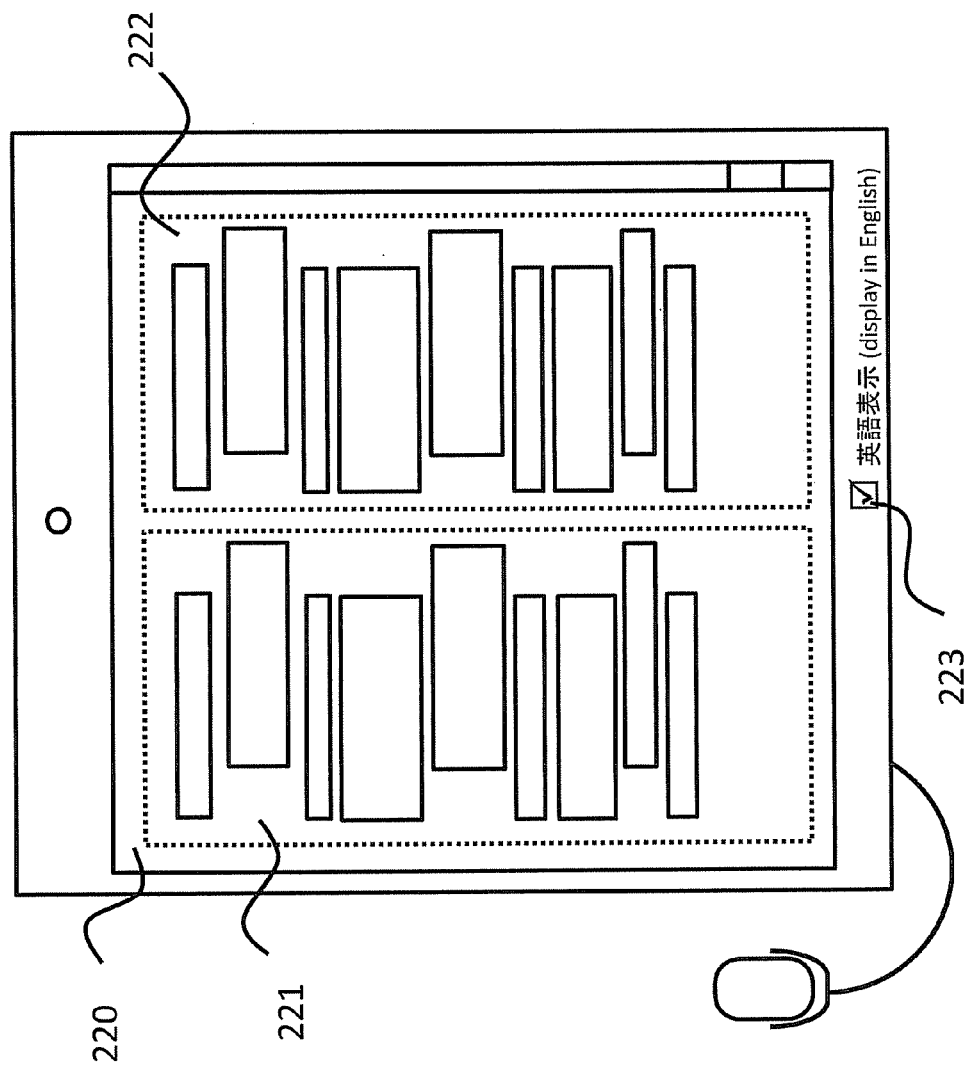
FIG. 3 shows a picture of a first display unit 220 in a first terminal device 200.

FIG. 3 shows a picture of a first display unit 220 in the device 200. The unit 220 has a first display area displaying a recognized Japanese text corresponding to Hanako's speech and a translated Japanese text corresponding to Jack's English speech, a second display area displaying a recognized English text corresponding to Jack's speech and a translated English text corresponding to Hanako's Japanese speech, an English display button switching display/non-display of the area 222.

Figure 4:
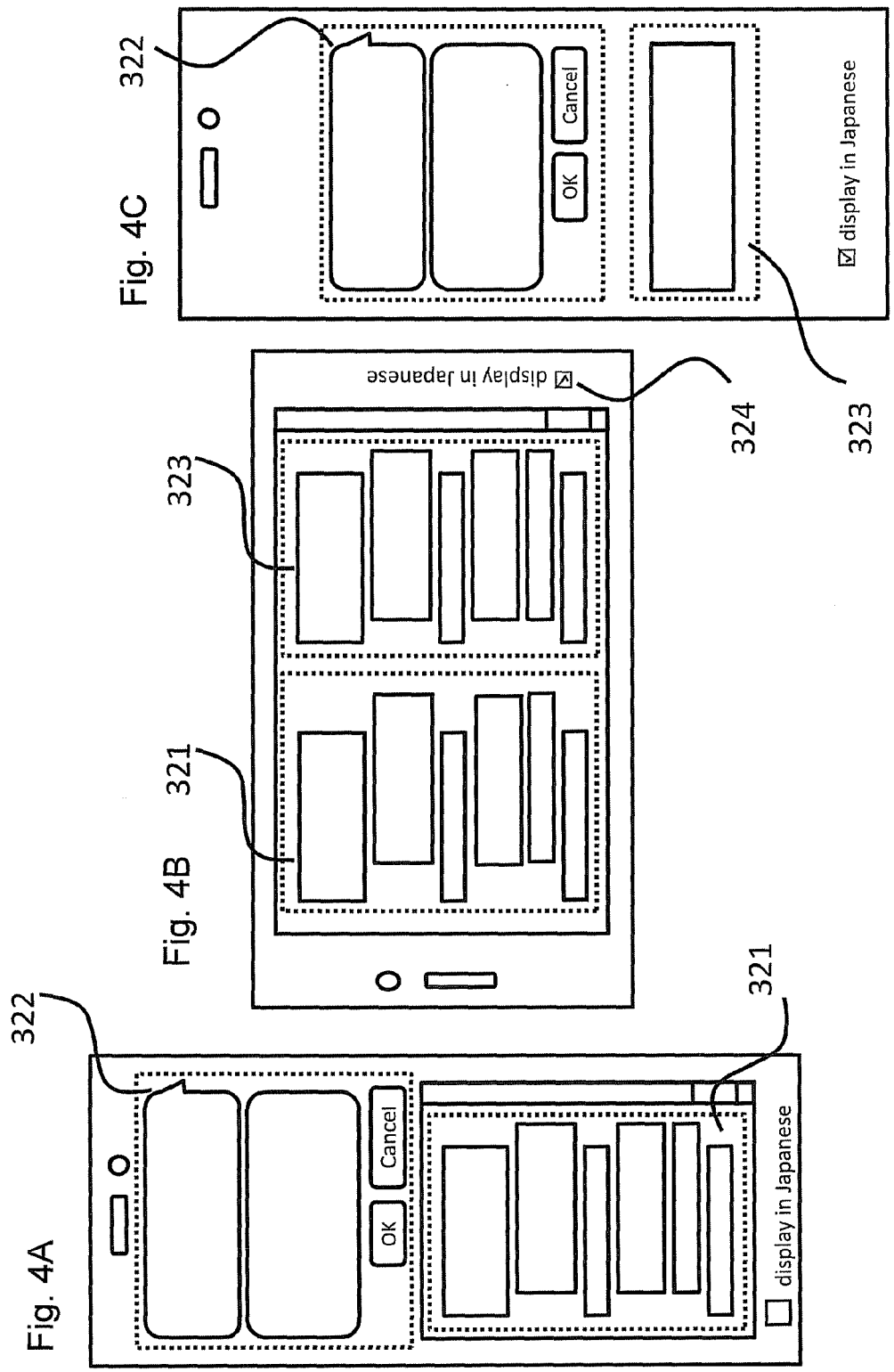
FIGS. 4A to 4C show pictures of a second display unit 320 in a second terminal device 300.

FIGS. 4A to 4C show pictures of a second display unit 320 in the device 300. The unit 320 has a third display area 321 displaying the recognized English text corresponding to Jack's speech and the translated English text corresponding to Hanako's Japanese speech, a fourth display area 322 displaying the recognized text corresponding to the latest Jack's speech, the reverse-translated text corresponding to the latest his speech, OK/Cancel button confirming whether accepting the recognized text or not, a fifth display area 323 displaying a English text corresponding to a Japanese text displayed on the area 321, and Japanese display button 324 switching display or non-display of the area 323.

When there is not enough display area to display the areas 321, 322 and 323, the area 322 can be non-display in order to display the area 323 in FIG. 4B.

Or, the unit 320 can non-display the area 321 and display the translated Japanese text corresponding to the recognized text of the area 322 on the area 323, that is to say, the unit 320 can have the area 322, the area 323 and Japanese display button 324.

FIG. 5 to FIG. 12 explains the example of this embodiment in which the first user being a shop clerk (Japanese speaker) face-to-face services the second user being a customer (English speaker).

Figure 5:
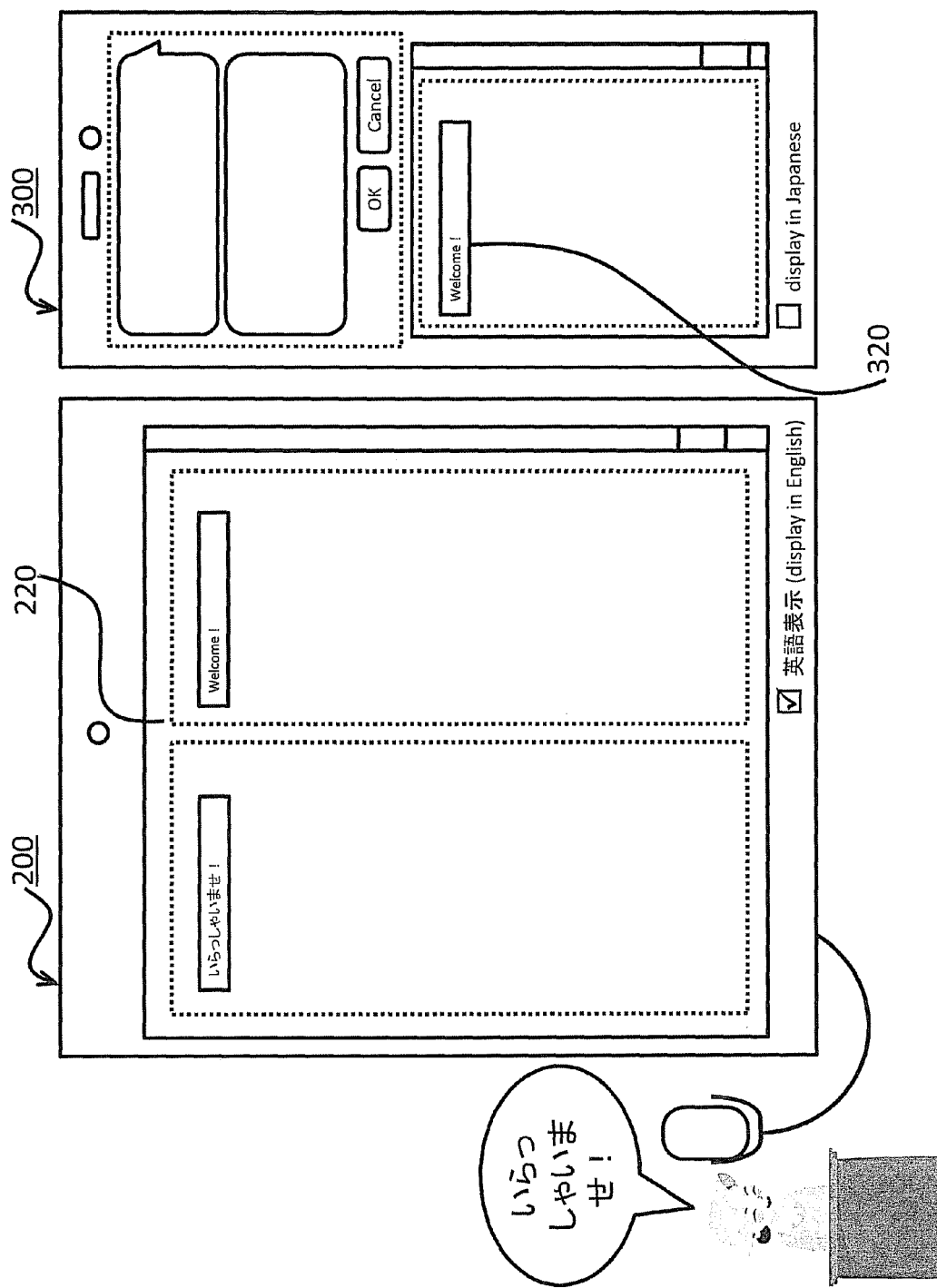
FIG. 5 shows an operation of the speech translation system.

FIG. 5 shows display contents of the device 200 and 300, when the first user says a Japanese speech ⌊いらっしゃいませ！⌋ (Irassyaimase!). The unit 220 displays both the recognized Japanese text ⌊いらっしゃいませ！⌋ (Irassyaimase!) and the translated English text "Welcome!" and the unit 320 just displays the translated English text "Welcome!"

FIG. 6 to FIG. 12 explains the example of this embodiment in which the first user and the second user have a dialogue.

Figure 6:
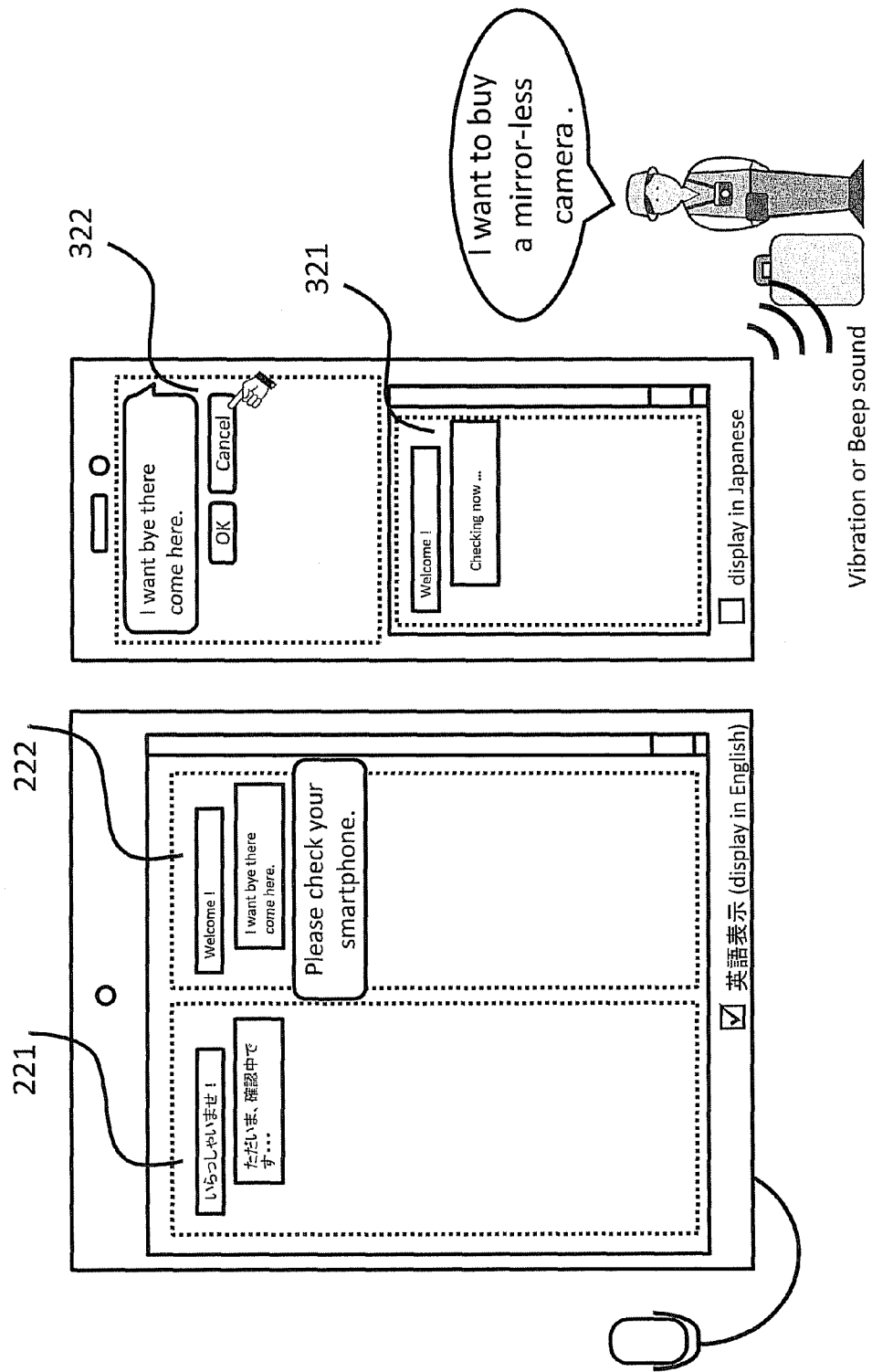
FIG. 6 shows another operation of the speech translation system.

FIG. 6 shows the example that the English speaker speaks an utterance. The unit 310 inputs the utterance "I want to buy a mirror-less camera." The device 110 executes speech recognition processes and outputs the recognized text "I want bye there come here." And the recognition likelihood (in this case "0.1"). The unit 430 compares the recognition likelihood with the predetermined threshold (in this case "0.8") and then decides that the recognized text "I want bye there come here" is error, as the recognition likelihood is smaller than the threshold. The device 120 does NOT execute machine translation processes. The unit 220 displays the recognized text and the area 322 of the unit 320 displays the recognized text "I want bye there come here."

When the English user looks at the unit 220 or looks away and then does not look at the unit 322 (that is to say, the English user does not look at the recognized text "I want bye there come here."), the first confirmation direction unit 450 needs to urge a check by the English user. The unit 450 controls the area 222 of the unit 220 to display the system message of confirmation "Please check your smartphone." The second confirmation direction unit 460 controls the smartphone 300 to be vibrated or to output a warning alarm for the English user. In addition, the area display the Japanese system message ⌊ただいま 確認中です . . . ⌋ (tadaima kakunintyu desu . . . ) for the Japanese user, which means the state of letting the English user confirm.

The area 321 displays the English message "Checking now . . . " which shows the state that the system prompts the English user to check the recognized text "I want bye there come here.".

When the English user taps the button "Cancel", the recognized texts are cleared on the area 222 and the area 223, the confirmation message is cleared, and the English message "Checking now . . . " displayed on the areas 221 and 321 are cleared.

On the other hand, When the English user taps the button "OK", the recognized text displayed on the area 322 is cleared, the machine translation processes is executed, the translated text is displayed on the area 221.

Figure 7:
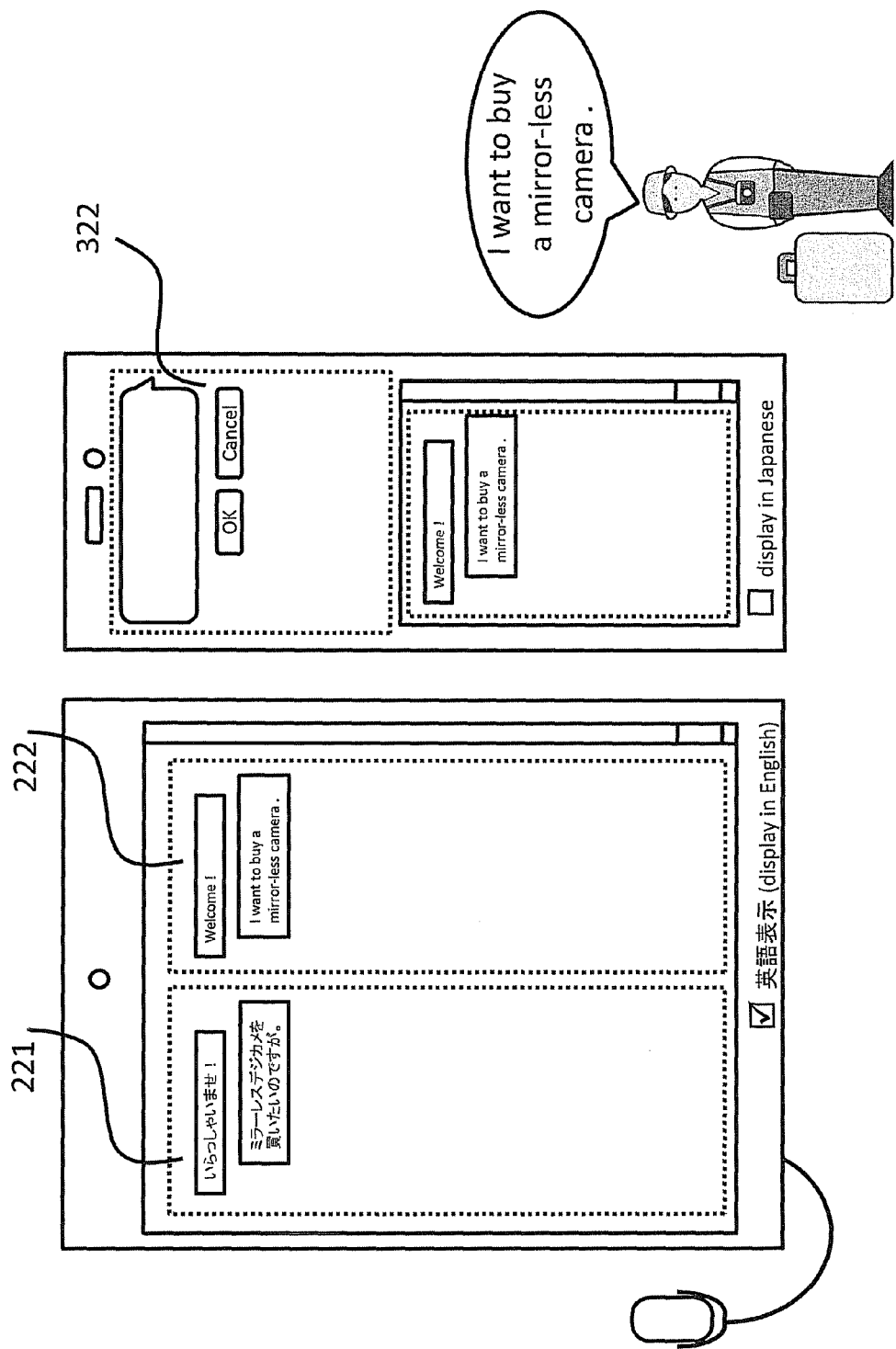
FIG. 7 shows another operation of the speech translation system.

FIG. 7 shows the example when the English user restates.

The device. 110 executes a speech recognition process for the restated utterance and outputs the recognized text and the recognition likelihood (1.0). The unit 430 decides that the recognition is correct, as the recognition likelihood is larger than the threshold (0.8). The device 120 translates the recognized text and outputs the translated text, and the reverse translation unit 121 reverse-translates the translated text and outputs the reverse-translated text.

The unit 440 compares the received text with the reverse-translated text and calculates the degree of coincidence (in this case "0.86"). The unit 440 compares the degree of coincidence with the predetermined threshold (in this case "0.8"), as the degree of coincidence is larger than the threshold, and decides that the translated text is correct. The area 222 display the translated text ⌊ミラーレスデジカメを買いたい のですが。⌋ (mira-lesu dejikame wo kaitai no desuga.) But the recognized text and the reverse-translated text are not displayed.

Figure 8:
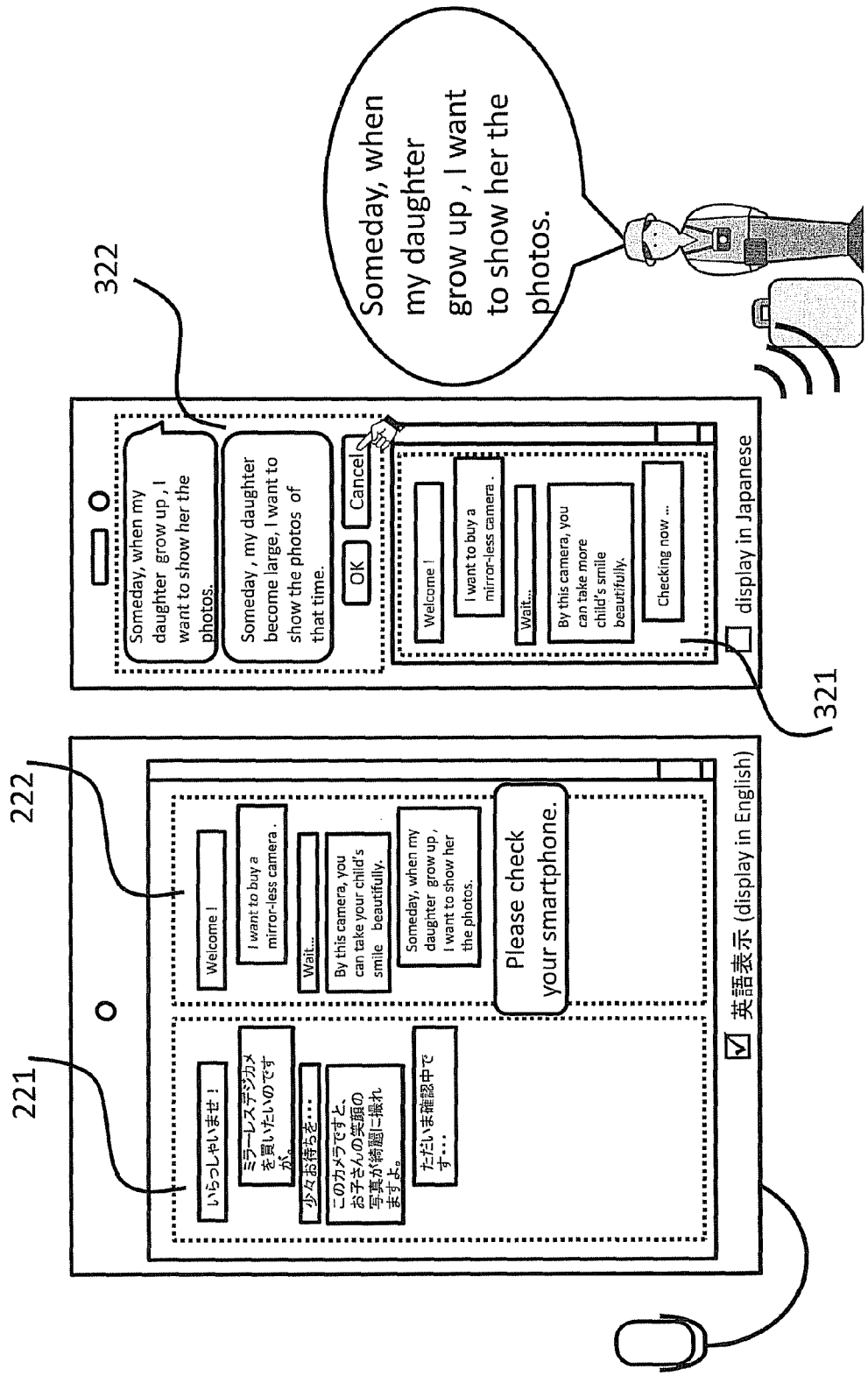
FIG. 8 shows another operation of the speech translation system.

FIG. 8 shows the example that the interactive dialogue progresses, the Japanese user speaks an utterance, and the English user speaks another utterance.

The English user's utterance "Someday, when my daughter grows up, I want to show her the photos" is inputted. The device 110 executes a speech recognition process and output the recognized text and the recognition likelihood (1.0). The unit 430 decides that the recognition likelihood is larger than the threshold. The area displays the recognized text. The device translates the recognized text to the translated text, and the unit 121 reverse-translates the translated text to the reverse-translated text.

The unit 440 compares the recognized text with the reverse-translated text, and calculates the degree of coincidence (in this case "0.69"). The unit 440 compares the degree of coincidence with the threshold (in this case "0.8"), as the degree of coincidence is smaller than the threshold, and decides that the translated text is error. As the English user is urged a check, the area 222 displays the confirmation message "Please check your smartphone." and the area 322 display the recognized text and the reverse-translated text "Someday, my daughter becomes large, I want to show the photos of that time." In addition, the smartphone is vibrated and a warning alarm is output.

Since the Japanese is told that the English user is confirming, the area 221 displays the message ⌊ただいま確認 中です . . . ⌋ (tadaima kakunintyu desu . . . ) and the area 321 displays the message "Checking now . . . ".

When the user taps the button "Cancel", the areas 221, 222, 321, and 322 is cleared. On the other hand, when the user taps the button "OK", each display is cleared and the area 222 displays the translated text.

Figure 9:
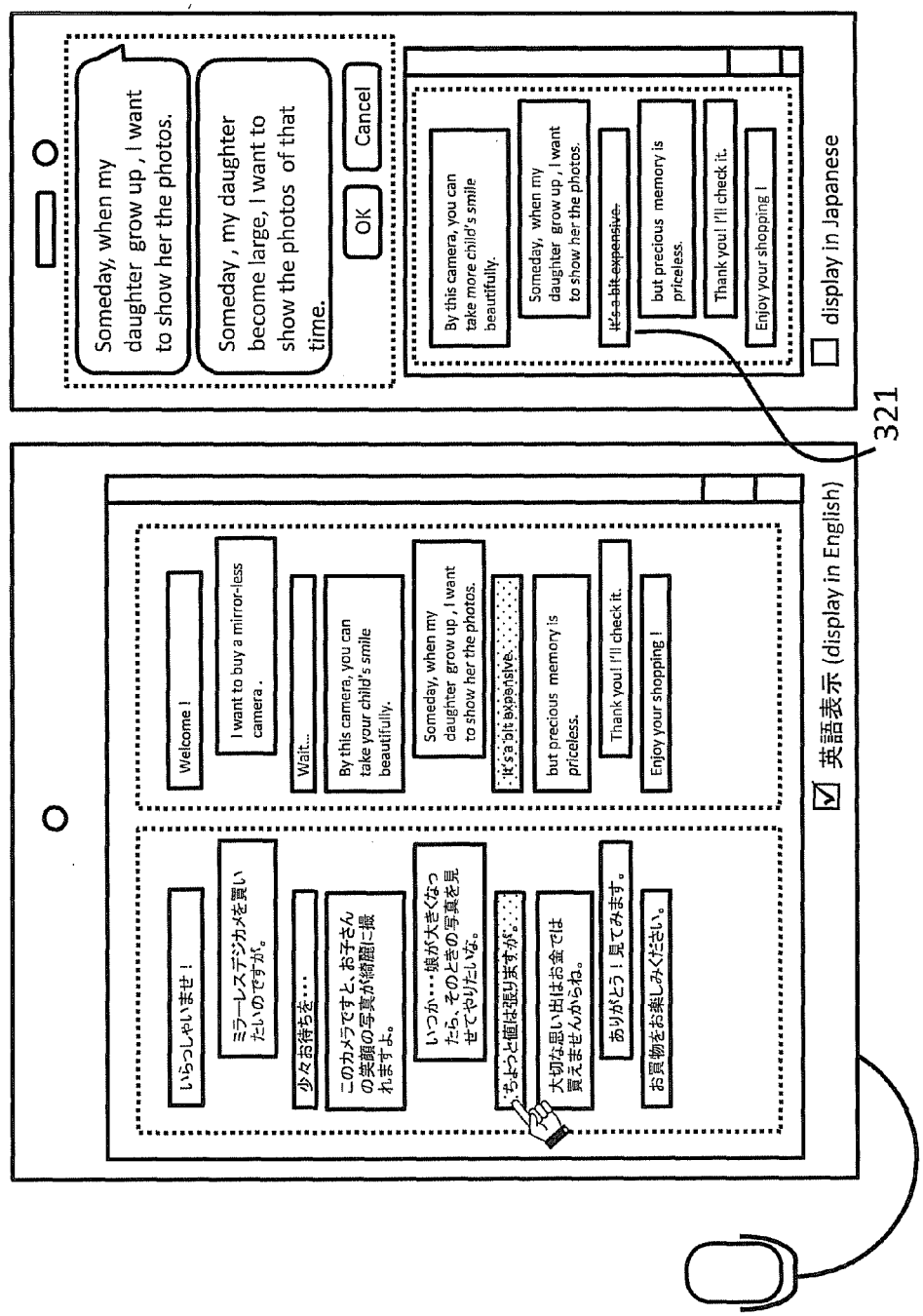
FIG. 9 shows another operation of the speech translation system.
Figure 10:
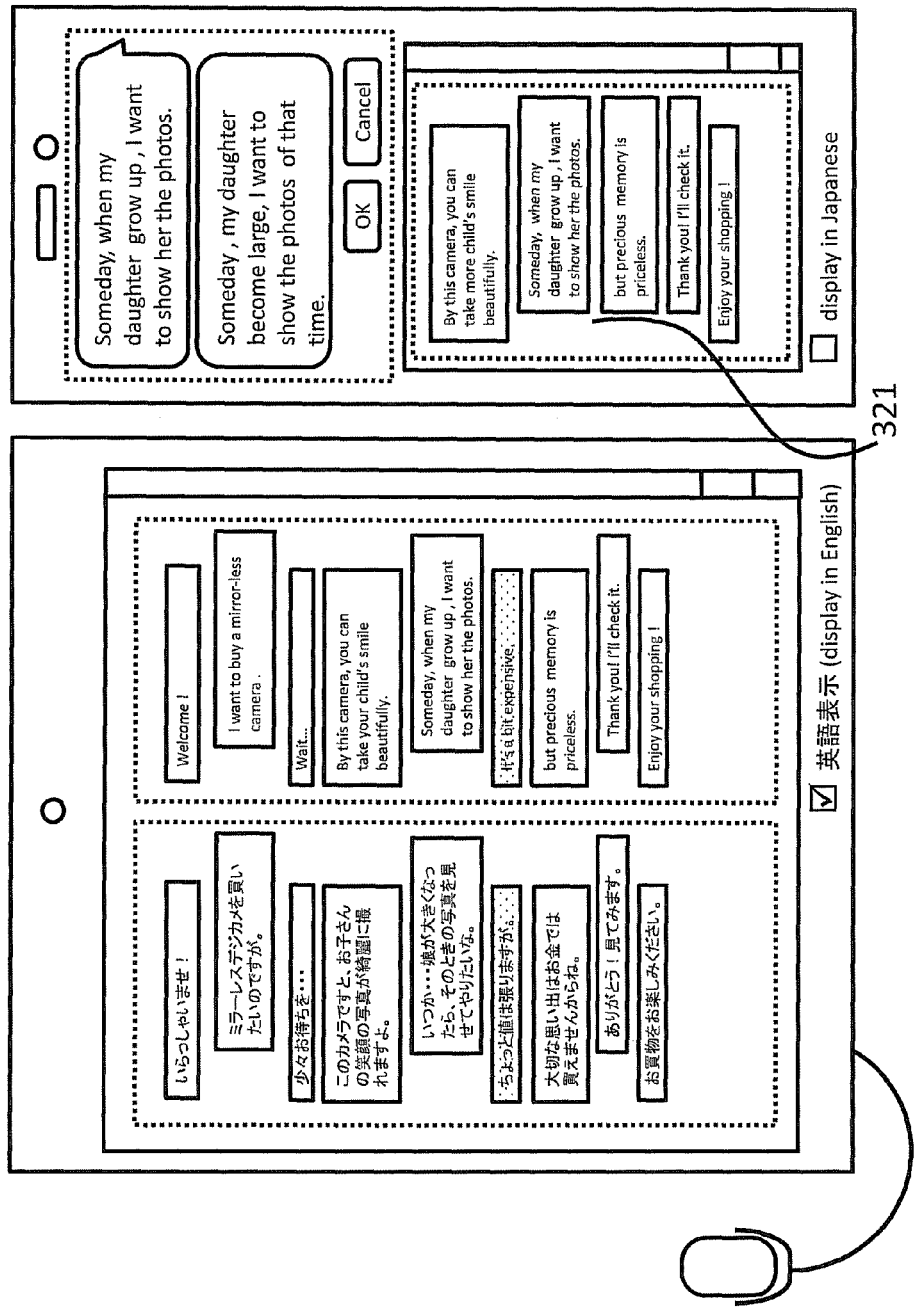
FIG. 10 shows another operation of the speech translation system.

FIG. 9 shows the example that the interactive dialogue progresses further. When the Japanese user deletes a part of his/her dialogues from the smartphone 300, the tablet computer 200 can do selected display/deletion. In this case, an example is that the English user wants to delete the dialogue ⌊ちょっと値は張りますが⌋ (chotto neha harimasuga) from the smartphone. The Japanese text ⌊ちょっと値は張りますが⌋

(chotto neha harimasuga) or the corresponding English text "It's a bit expensive" is tapped, both texts are highlighted (refer to "Shading" in FIG. 9). The English text "It's a bit expensive" displayed on the area 321 is deleted and then it is displayed in FIG. 10. If the Japanese user taps the highlighted text, the text is normal displayed on the tablet computer, and the English text "It's a bit expensive" is again displayed on the smartphone.

In this way, to select the dialogue that is made carelessly or misunderstanding on the Shop clerk's device 200 is to delete the dialogue from the customer's device 300. On the other hand, only the important dialogue can be left on the customer's device 300.

Figure 11:
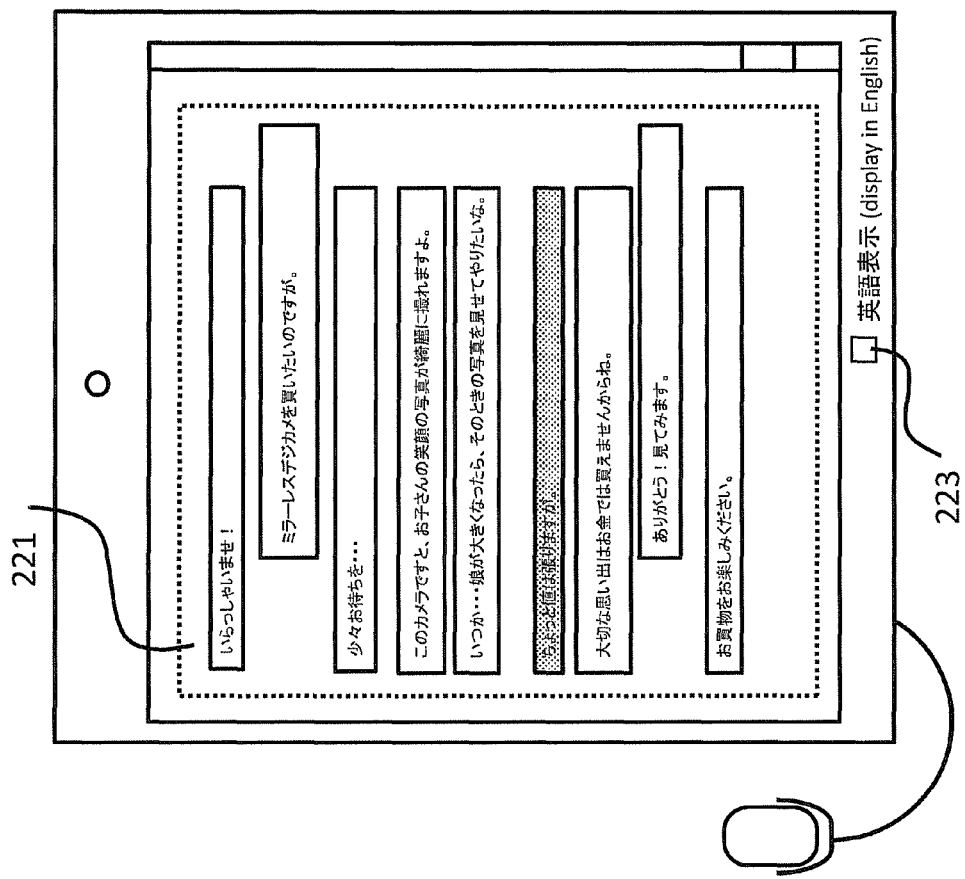
FIG. 11 shows another operation of the speech translation system.

FIG. 11 shows the example when the check box of the English display button in the device 200 is cleared. In this case, as the area 222 is non-displayed and the area 221 becomes longer horizontally, each dialogue is displayed at each line on the area 221. Therefore, many more dialogue histories can be displayed on the area 221.

Figure 12B:
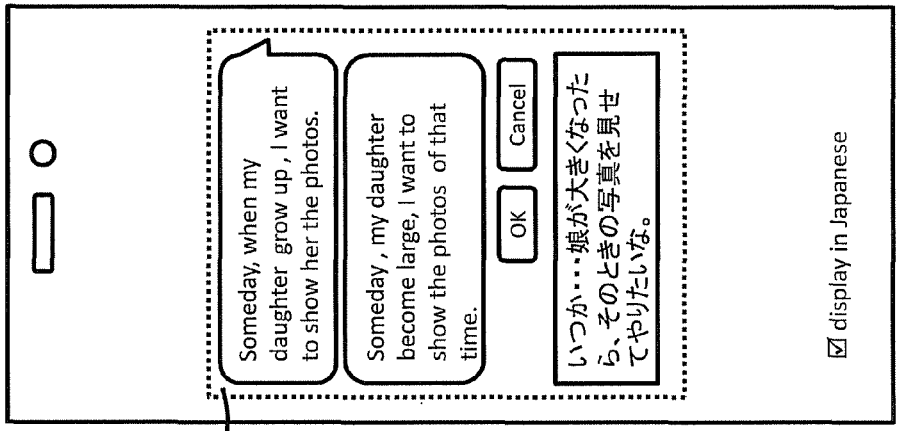
FIGS. 12A and 12B show another operation of the speech translation system.
Figure 12A:
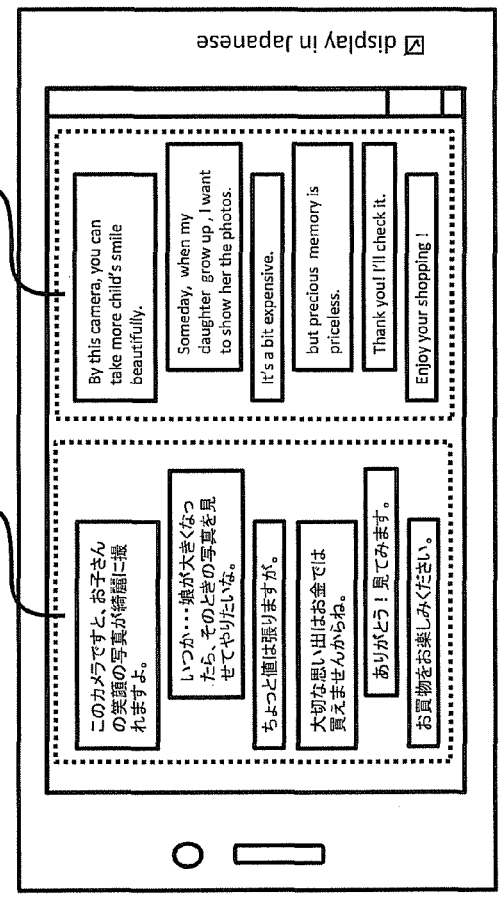

FIGS. 12A and 12B show examples when the check box of the button "display in Japanese" 324 in the device 300 is cleared. This is only selectable, if the check box of the button "display in English" 223 in the device 200 is cleared. That is to say, it is not selectable, if the area 222 for displaying the English text in the device 200 is displayed.

FIG. 12A shows that a display is rotated 90 degrees to the left, the area 321 of the first language is displayed on the left side of the display, and the area 323 of the second language is displayed on the right side of the display.

FIG. 12B shows that the translated text of the first language is also displayed on area 322 which displays the recognized text of the second language and the corresponding reverse-translated text.

FIGS. 13 to 21 illustrates a flow chart of the operation of the speech translation system. The flow charts are able to the operation of the system shown in FIGS. 5 to 12.

Figure 13:
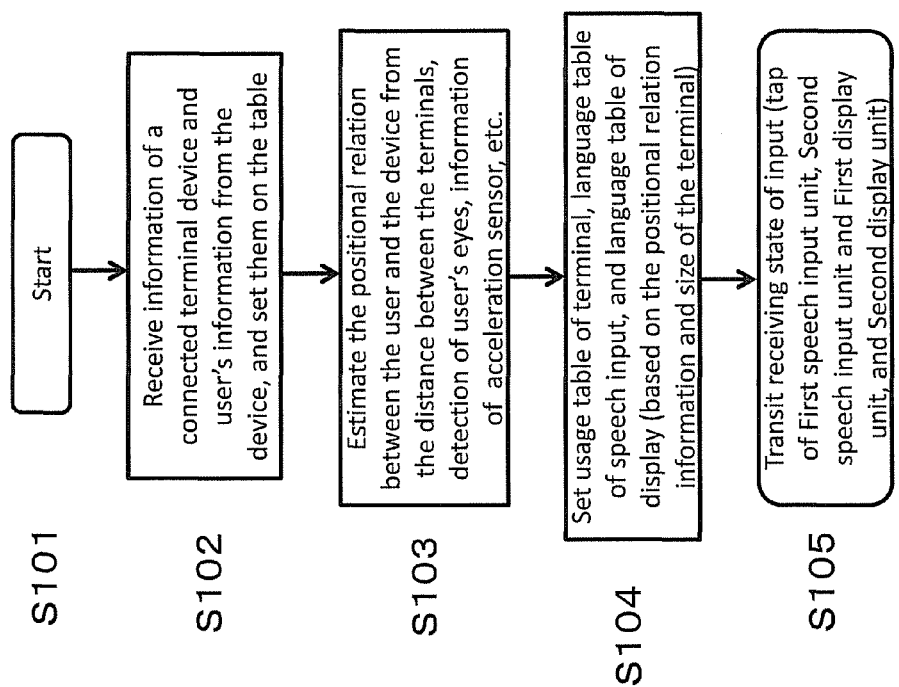
FIG. 13 illustrates a flow chart of the operation of the speech translation system.

FIG. 13 illustrates a flow chart that is executed first, when the device 200 and the device 300 is connected. The tables shown in FIG. 22 are made and the values are set to initial values.

In step 102, the device 200 and the device 300 are given each "1" and "2" for Terminal IDs. User names and Language name of the devices 200 and 300 are acquired. The first user (Hanako) and the second user (Jack) are given each "1" and "2" for User IDs. The corresponding table of Language name (Japanese, English) and Language ID (JP, EN) are previously stored in the device 130. FIG. 22A shows a table which is made in step 102.

In step 103, the spatial relationship between user and terminal is estimated. In step 104, the difference of terminal sizes (in detail, display sizes of terminals) is compared, and it is determined that each user uses each terminal for inputting speech, and uses each display of terminal for outputting. In this case, it is assumed that both the Japanese user and the English user look at the bigger display of the tablet computer 200 of the Japanese user, and the English user holds the smartphone 300 and is able to just look at the smaller display of the smartphone 300 (the Japanese user can not look at the smaller display). The Japanese user inputs speech by the microphone of the tablet computer 200. The English user inputs speech by the microphone of the smartphone 300. FIG. 22B shows the terminal usage table in this case.

In this case of speech input language, the tablet computer 200 only inputs English speech and the smartphone 300 only inputs Japanese speech, and the speech input language table is set in FIG. 22C.

On the other hand, in this case of display language, the tablet computer 200 displays both English and Japanese, and the smartphone 200 displays only Japanese, and the display language table is set in FIG. 22D.

In step 105, speech input units and display units (for detecting taps) of the tablet computer 200 and the smartphone 300 is transited to the receiving state of input.

Figure 14:
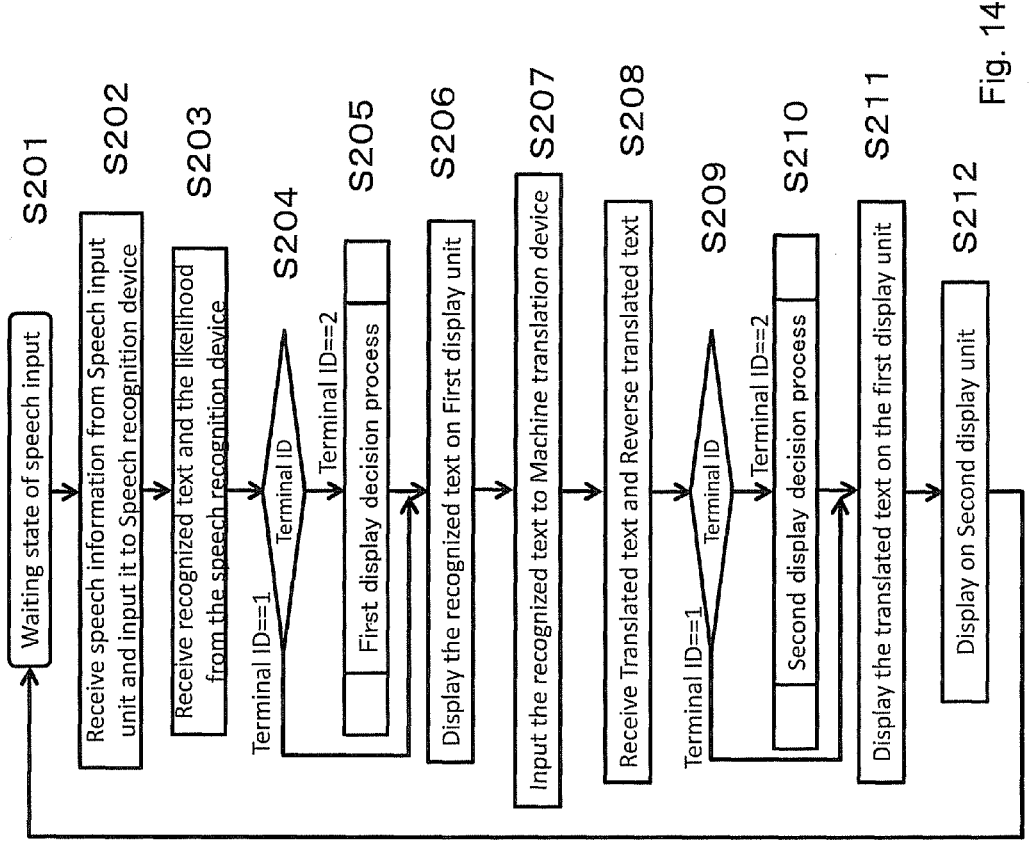
FIG. 14 illustrates another flow chart of the operation of the speech translation system.

FIG. 14 illustrates a flow chart of inputting speech.

The unit 210 detects speech input (Step 201) and then Step 202 receives the speech information from the unit 210 and input it to the device 110. The process of the device 110 transforming the speech information to the recognized text is known. Since the process is known, a detailed explanation is omitted for brevity.

In step 203, the processes of the device 110 is finished, the device 400 receives the recognized text and the recognition likelihood, add Dialogue IDs to them, write them in dialogue history table in the device 130, with User IDs and Recognize language IDs (refer to the first line shown in FIG. 23).

In step 204, when the terminal ID is "1", the process goes to S206. When the terminal ID is "2", the process goes to S205.

Figure 15:
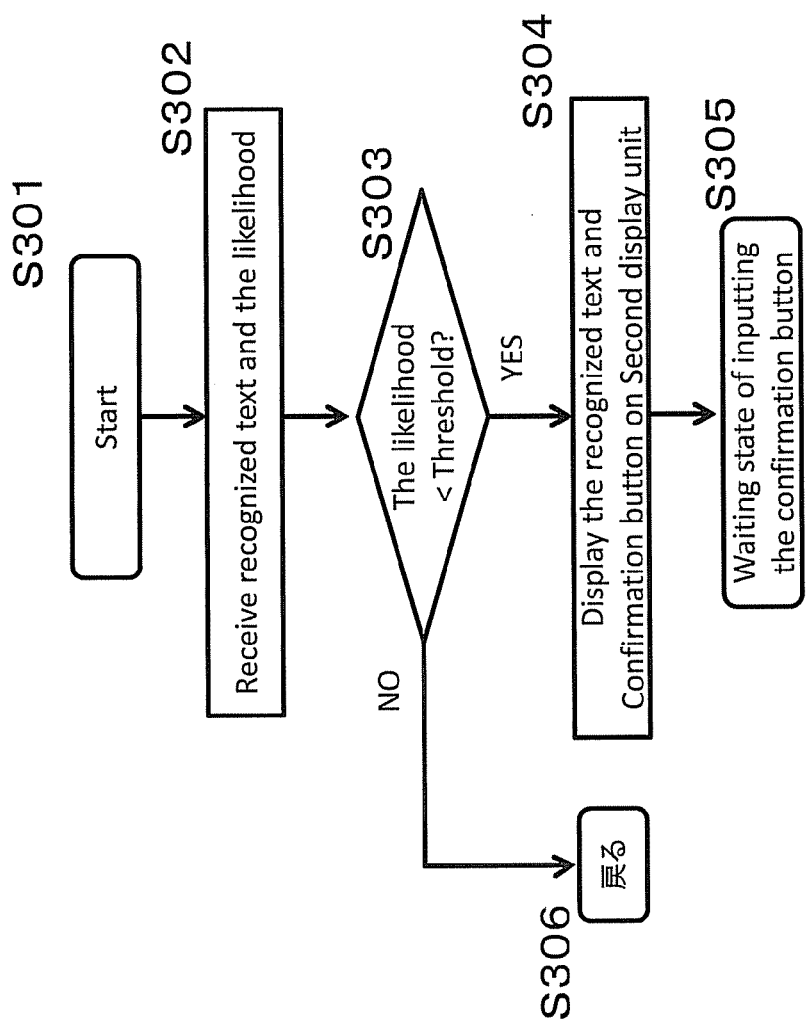
FIG. 15 illustrates another flow chart of the operation of the speech translation system.

Step 205 calls the process of the unit 430 in the device 400 shown in FIG. 15.

Step 206 sends the recognized text to the device 200 and displays it on the unit 220.

Step 207 inputs the recognized text in the device 120. S208 receives the translated text and the reverse-translated text and write them in the dialogue history table shown in FIG. 23.

The process of the device 120 translating the first language text to the second language text is known as various technologies. Since their technologies can be used, the detailed explanation is omitted.

Step 209 branches the processes according to the terminal IDs. When the terminal ID is "1", the process goes to S211. When the terminal ID is "2", the process goes to S210.

Figure 16:
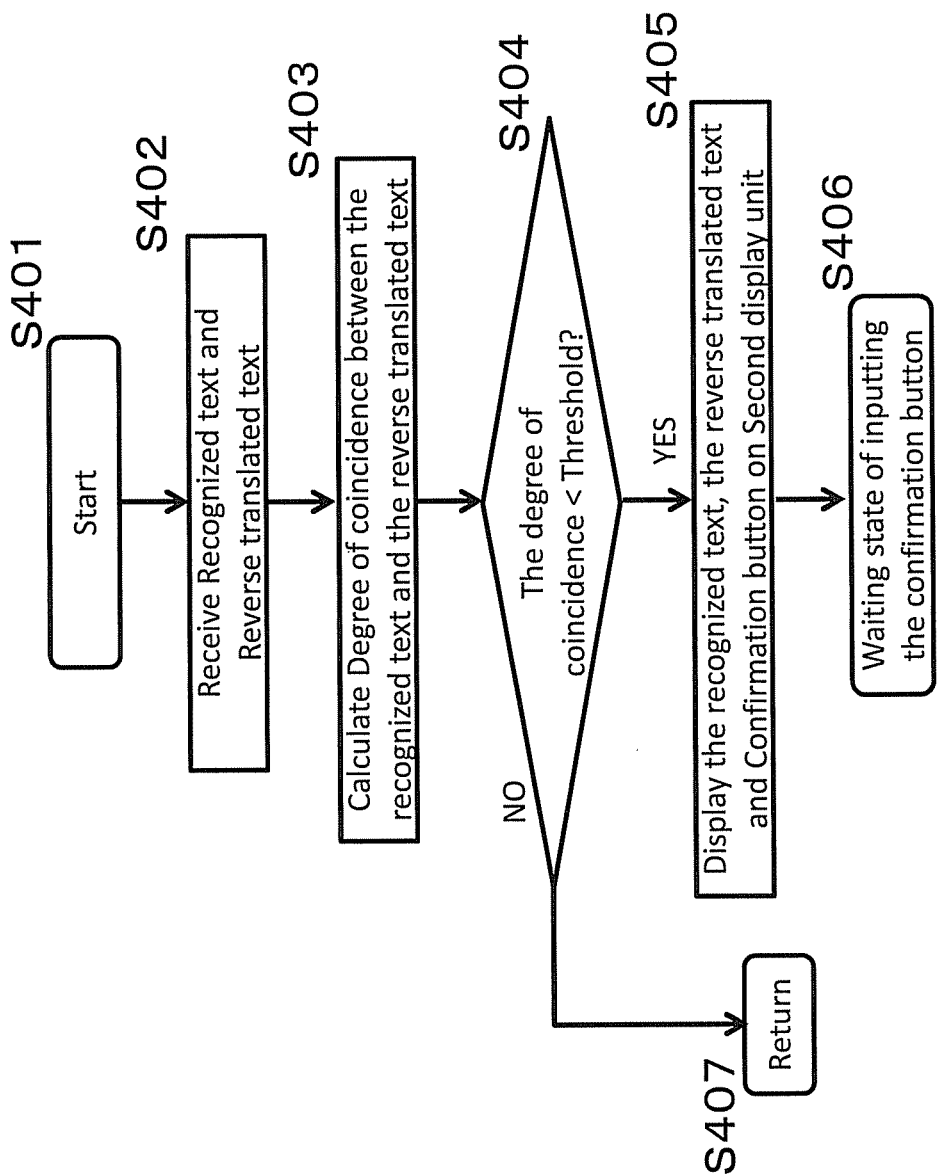
FIG. 16 illustrates another flow chart of the operation of the speech translation system.

S210 calls the process of the unit 440 of the device 400 which is shown in FIG. 16.

S211 sends the translated text to the device 200 and displays them on the unit 220.

S212 sends the recognized text or the translated text (that is, the second language text) which are corresponding to Language ID "2" in the dialogue history table, to the device 300, and displays them on the area 321 of the unit 320.

When the display process in Step 212 is finished, the process again transits to the waiting state of inputting speech.

FIG. 15 illustrates a flow chart of the first display decision unit 430.

S302 receives the recognized text and the recognition likelihood.

S303 compares the recognition likelihood with the threshold (in this case "0.8").

When the recognition likelihood is smaller than the threshold, the process goes to S304.

On the other hand, when the recognition likelihood is larger than the threshold, the process goes to S306 and returns to the flow of the call script (S205 shown in FIG. 14).

Step 304 sends the recognized text to the device 300 and controls that the recognized text and the confirmation button is displayed on the area 322 of the unit 320.

In step 305, the unit 320 of the device 300 transits to the waiting state of inputting the confirmation button.

If the device 300 inputs a speech, it can be set confirmation display to clear.

FIG. 16 illustrates a flow chart of the second display decision unit 440.

The device 400 receives the recognized text and the reverse-translated text (S402).

S403 calculates the degree of coincidence between the recognized text and the reverse-translated text.

The index of the degree of coincidence is known as various technologies. In this case, the index is the value which is (a) the numbers of words included in both the recognized text and the reverse-translated text divided by (b) the total numbers of word included in the recognized text. When the degree of coincidence is smaller than the threshold (in this case "0.8"), the process goes to S405 (S404).

When the degree of coincidence is larger than the threshold, the process returns to the flow of the call script (S210 shown in FIG. 14).

S405 displays the recognized text, the reverse-translated text and the confirmation button on the area 322 of the unit 320.

S406 transits the unit 320 of the device 300 to the waiting state of inputting the confirmation button.

Figure 17:
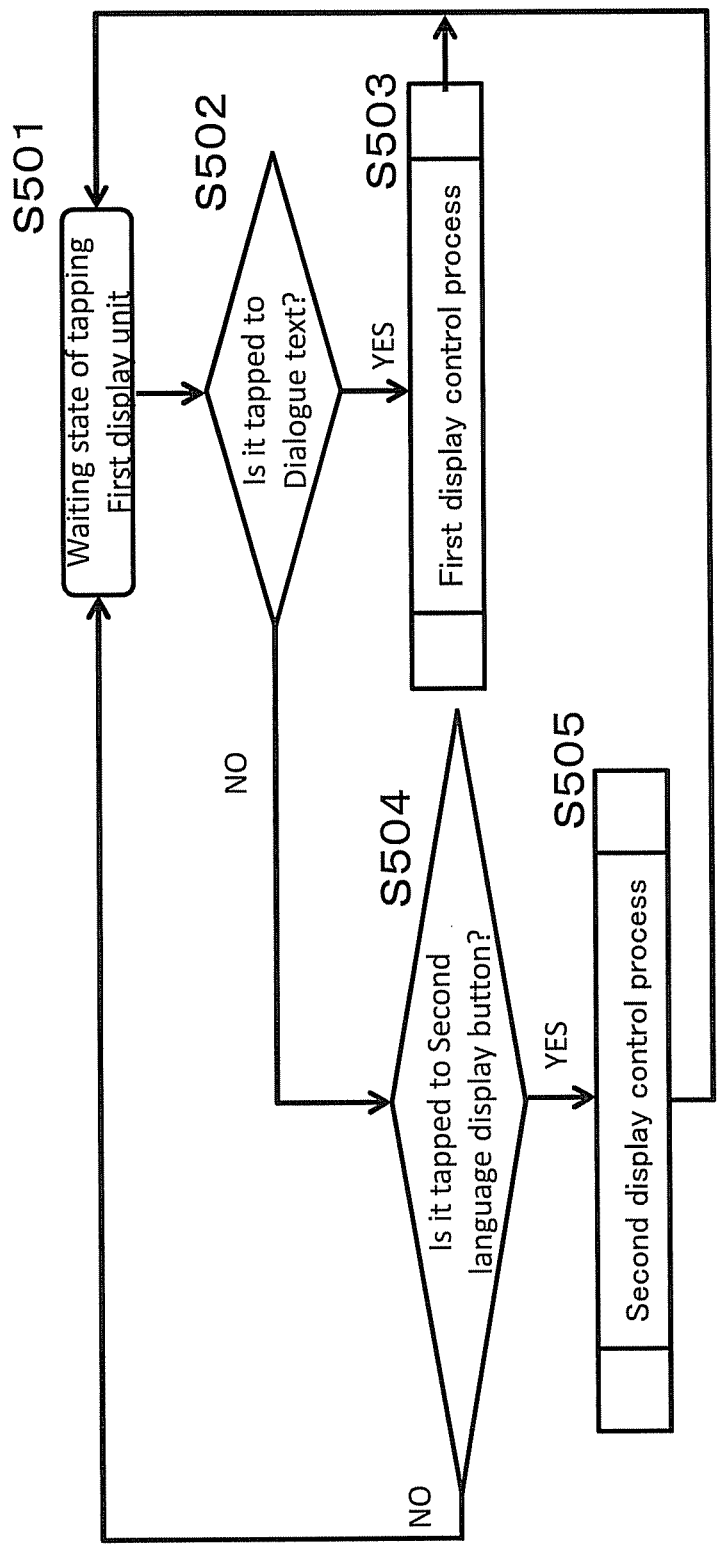
FIG. 17 illustrates another flow chart of the operation of the speech translation system.

FIG. 17 illustrates a flow chart of the operation, when a user taps the unit 220.

S501 transits the waiting state of receiving tap to S502. If the speech text (the texts of the area 221 and the area 222) is tapped, the process goes to S503. If not, the process goes to S504.

Figure 18:
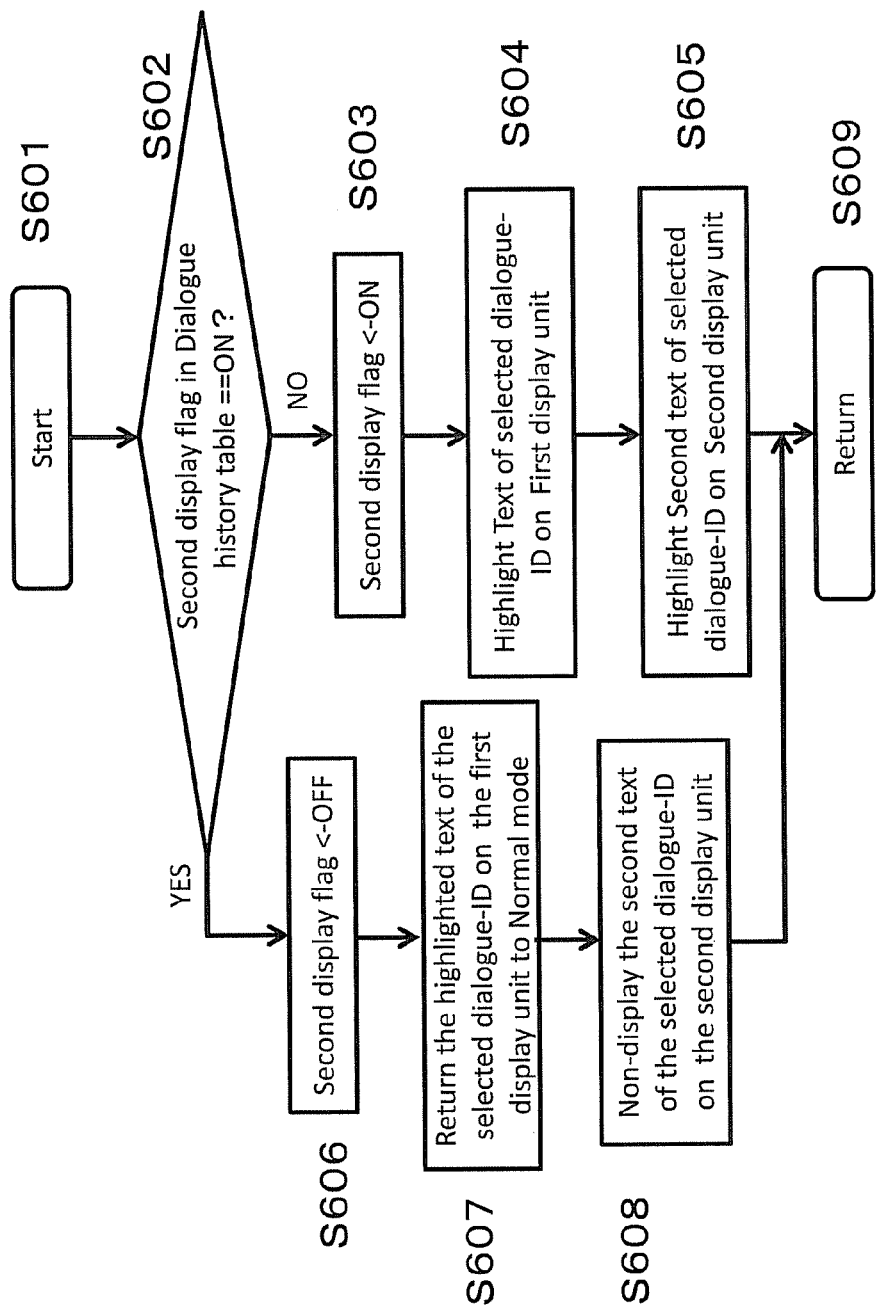
FIG. 18 illustrates another flow chart of the operation of the speech translation system.

S503 calls the flow chart of the unit 410 in the device (shown in FIG. 18).

In S504, if the tap is a tap to the second language display button, the process goes to S505. If the tap is another tap to areas except for the second language display button, the process goes to S501.

Figure 20:
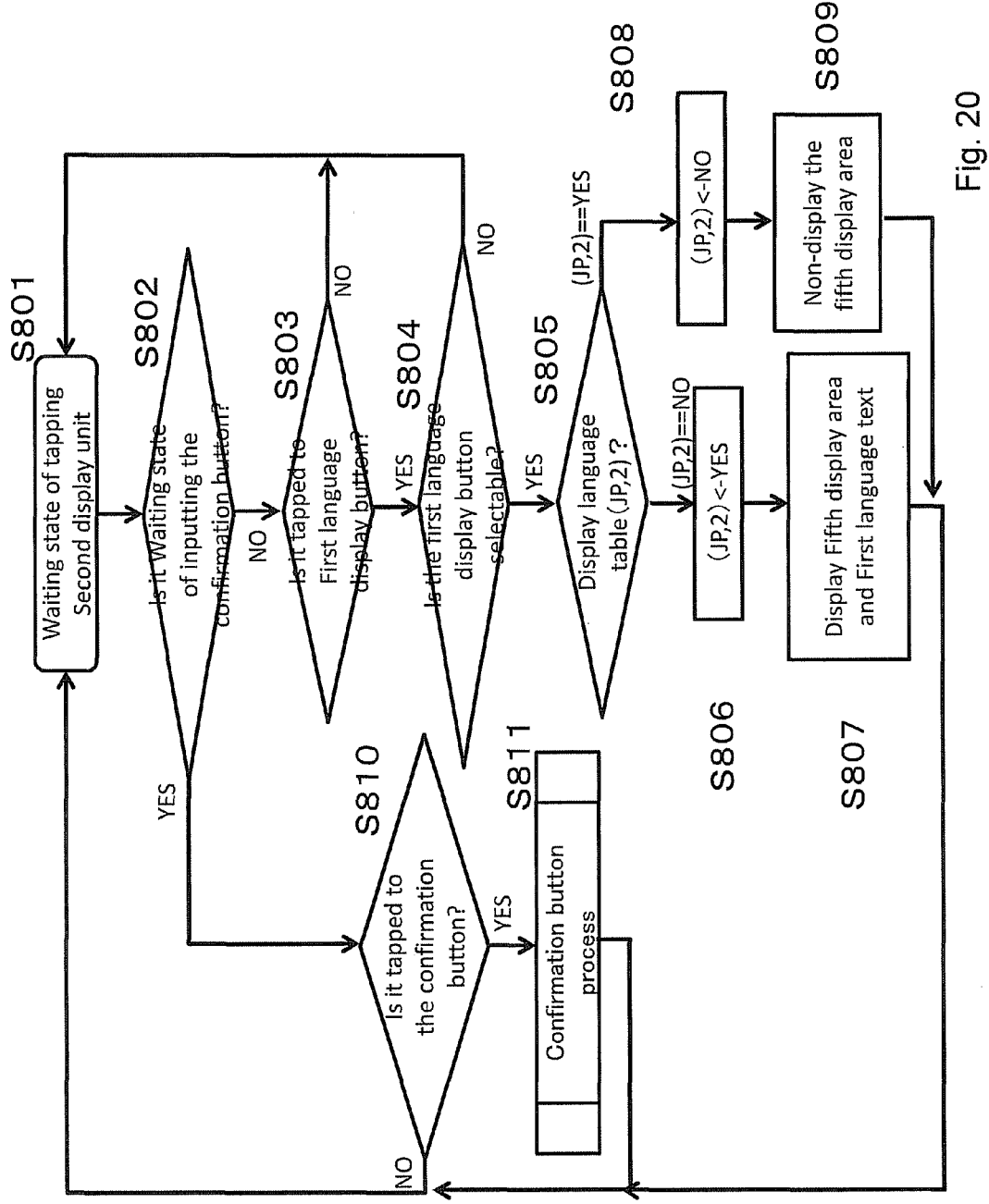
FIG. 20 illustrates another flow chart of the operation of the speech translation system.

Step 505 calls the flow chart of the unit 420 of the device 400 (shown in FIG. 20).

FIG. 18 illustrates a flow chart of the unit 410 in the device 400.

S602 identifies which of the recognized text and the translated text in FIG. 23 corresponds to the tapped text and refers the second display flag in which of the dialogue ID is identified. If the second display flag is "OFF", the process goes to S603. If the second display flag is "ON", the process goes to S606.

S603 rewrites the second display flag in the dialogue history table to "ON".

S604 displays the texts of the first and second display areas corresponding to the dialogue ID of the unit 220, to high-light.

The second language texts corresponding to the dialogue ID of the unit 320 (that is to say, the recognized text and the translated text in which the language ID is "2") are sent to the device 300. It is controlled that the second language texts are displayed on the area 321 of the unit 320, in order of the dialogue ID.

S606 rewrites the second display flag of the dialogue ID in the dialogue history table to "OFF".

S607 returns the highlighted text corresponding to the dialogue ID to normal-display.

S608 deletes the display of text corresponding to the dialogue ID of the unit 320.

S609 returns to the flow of the call script.

Figure 19:
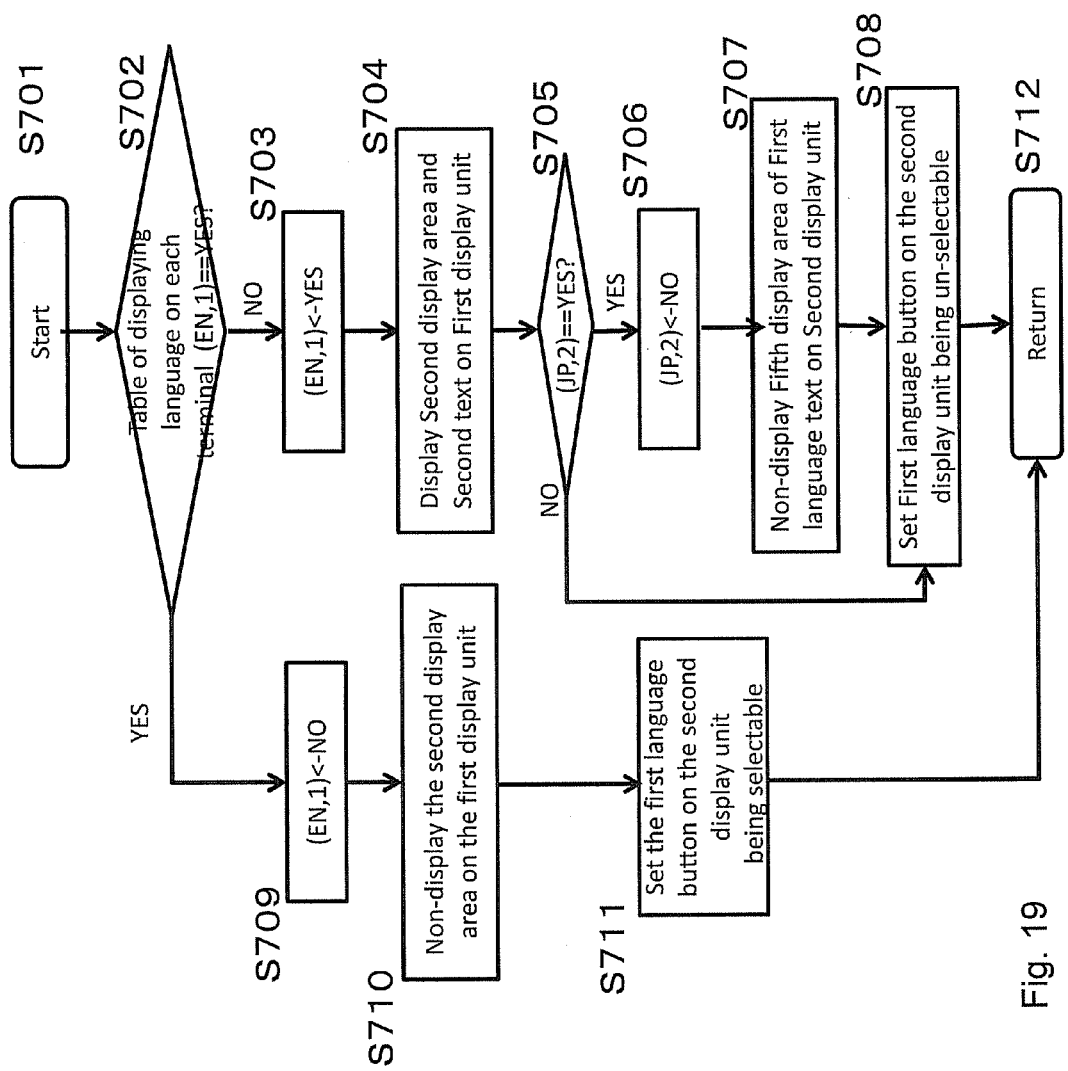
FIG. 19 illustrates another flow chart of the operation of the speech translation system.

FIG. 19 illustrates a flow chart of the unit 420 in device 400.

When the second language display button is tapped, S702 refers the value of the column (EN, 1) of the second language (English, Language ID=EN) of the device 200 in the display language table. If the value is "NO", the process goes to S703. If the value is "YES", the process goes to S709.

Step 703 rewrites the value of the column (EN, 1) to "YES".

Step 704 controls that the unit 220 displays the area 222 and the text of the second language (English).

S705 refers the value of the column (JP, 2) of the first language (Japanese, Language ID=JP) of the device 300 (the terminal ID=2). If the value is "YES", the process goes to S706. If the value is "NO", the process goes to S708.

Step 706 rewrites the value of the column (JP, 2) to "NO".

In step 707, the unit 320 controls that the area 323 displaying the first language text is non-displayed.

S708 controls that the first language display button (Japanese display button) can not be selected, and the process goes to S711.

S709 rewrites the value of the column (EN, 1) to "NO".

S710 controls that the area 222 of the unit 220 is non-displayed, and the process goes to S711.

S711 sets the first language display button 324 ("display in Japanese") of the unit 320 to be selectable.

S712 returns to the flow of the call script.

FIG. 20 illustrates a flow chart when a user taps the unit 320 in the device 300.

The process goes from waiting state of tapping the unit 320 (S801) to S802.

If the unit 320 is not currently waiting state of inputting the confirmation button, the process goes to the S803. If it is, the process goes to the S810.

S803 decides whether it is tapped to the first language display button 324. If it is tapped, the process goes to S804. If it is not tapped, the process returns to S801.

S804 decides whether the button 324 is selectable. If the button is not selectable, the process goes to the S708 of the flow chart of the unit 420 in the device 400.

If the button 324 is selectable, the process goes to S805. If not, the process returns to S801.

S805 refers to the value of the column (JP, 2) in the display language table, since the display set of the first language (Japanese) of the device 300 is confirmed. If the value of the column (JP, 2) is "YES", the process goes to S808. If it is "NO", the process goes to S806.

S806 rewrites the value of the column (JP, 2) to "YES".

S807 displays the area 323 and the first language text, and then returns to S801.

S808 rewrites the value of the column (JP, 2) to "NO".

S809 non-displays the area 323 and then returns to S801.

In step 810, when in the waiting state of tapping the confirmation button, if it is tapped to the confirmation button, the process goes to S811. If it is not, the process returns to S801.

Figure 21:
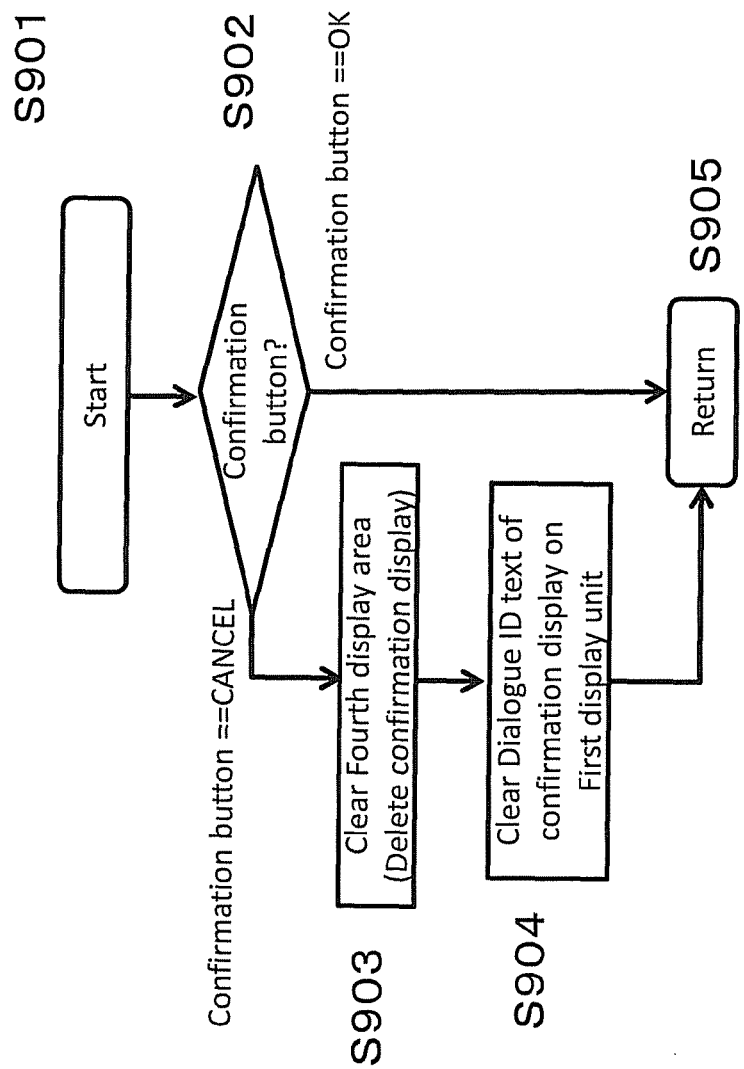
FIG. 21 illustrates another flow chart of the operation of the speech translation system.

S811 calls the flow chart of the confirmation button (shown in FIG. 21).

FIG. 21 illustrates a flow chart when a user taps the confirmation button of the unit 320.

If the confirmation button is "OK" in S902, the process goes to S905. If the button is "CANCEL", the process goes to S903.

S903 clears the area 322.

S904 deletes the text corresponding to the dialogue ID displayed on the area 322, from the unit 220.

S905 returns to the flow of the call script.

According to speech translation system of at least one embodiment described above, the first terminal device displays a first text set and a second text set, and the second terminal device displays at least one text of the second text set. Therefore, the speech translation system can provides face-to-face services or face-to-face conversations that one terminal can be seen by both users and the other terminal can be seen by only one user.

The flow charts of the embodiments illustrate methods and systems according to the embodiments. It will be understood that each block of the flowchart illustrations, and combinations of blocks in the flowchart illustrations, can be implemented by computer program instructions. These computer program instructions can be loaded onto a computer or other programmable apparatus to produce a machine, such that the instructions which execute on the computer or other programmable apparatus create means for implementing the functions specified in the flowchart block or blocks. These computer program instructions can also be stored in a non-transitory computer-readable memory that can direct a computer or other programmable apparatus to function in a particular manner, such that the instruction stored in the non-transitory computer-readable memory produce an article of manufacture including instruction means which implement the function specified in the flowchart block or blocks. The computer program instructions can also be loaded onto a computer or other programmable apparatus/device to cause a series of operational steps/acts to be performed on the computer or other programmable apparatus to produce a computer programmable apparatus/device which provides steps/acts for implementing the functions specified in the flowchart block or blocks.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, consider the case of a lecture. When the first terminal device 200 is a projector and the second terminal device 300 is a terminal which each foreign audience holds, it is used the speech translation system similar to the above embodiment.

What is claimed is:

1. A speech translation system comprising:
   a first terminal device comprising a first speech input for inputting a first speech of a first language spoken by a first user, and converting the first speech to a first speech signal;
   a second terminal device comprising a second speech input for inputting a second speech of a second language spoken by a second user, and converting the second speech to a second speech signal;
   a speech recognition device that receives the first speech signal and the second speech signal, recognizes the first speech signal to a first recognized text, and recognizes the second speech signal to a second recognized text;
   a machine translation device that receives the first recognized text and the second recognized text, translates the first recognized text to a first translated text of the second language, and translates the second recognized text to a second translated text of the first language;
   a control device; wherein the first terminal device receives
   (a) a first text set of the first language being the first recognized text and the second translated text, and (b) a second text set of the second language being the second recognized text and the first translated text, and comprises a first display unit that displays the first text set and the second text set; and the second terminal device receives at least one text of the second text set, and comprises a second display unit that displays the at least one text of the second text set;
   a third terminal device comprising a third speech input for inputting a third speech of a third language spoken by a third user, and converting the third speech to a third speech signal;
   the speech recognition device receives the third speech signal, and recognizes the third speech signal to a third recognized text;
   the machine translation device receives the third recognized text and the first recognized text, further comprises a third machine translation unit that translates the third recognized text to the third translated text of the first language, and translates the first recognized text to the fourth translated text of the third language;
   the first display unit displays (a) at least one text set of the second text set and a third text set of the third language being the third recognized text and the fourth translated text, and (b) the fourth text set of the first language being the first text set and the third translated text; and
   the third terminal device further comprises the third display unit that displays at least one text of the third text set.

2. The system according to claim 1, wherein the machine translation device further comprises a reverse translation unit that reverse-translates the second translated text of the first language to a second reverse-translated text of the second language; the second display unit displaying at least one text of the second text set and the third text set of the second reverse-translated text of the second language.

3. The system according to claim 1, wherein a first size of display area on the first display unit is larger than a second size of display area on the second display unit.

4. The system according to claim 1, wherein the first terminal device further comprises a first display selection unit that receives a selection of text from the first text set and the second text set displayed on the first display unit; the control device comprises a first display control unit that controls displaying at least one text of the second text set on the second display unit, if the first display selection unit receives the selection.

5. The system according to claim 1, wherein the second display unit displays at least one text of the first text set, the first terminal device further comprises the second display selection unit that receives a selection of whether the second text set is displayed on the first display unit; the control device furthermore comprises a display control unit that controls that the text of the first text set is not displayed on the second display unit, if the second display selection unit receives the selection that the second text set is displayed.

6. The system according to claim 1, wherein the control device further comprises a first confirmation direction unit that displays a notification message of the second language, when the second text set is displayed on the second display unit.

7. The system according to claim 1, wherein the control device further comprises a second confirmation direction unit that vibrates the second terminal device and/or output a confirmation sound, when the second text set is displayed on the second display unit.

8. The system according to claim 1, wherein the speech recognition device outputs the recognized text and a recognition likelihood representing confidence of the speech recognition process; the control device further comprises a second recognition display decision unit that decide whether the second recognition text is displayed on the second display unit, based on the recognition likelihood.

9. The system according to claim 1, wherein the control unit further comprises the second reverse translation display decision unit decide whether the second display unit is displayed, based on a degree of coincidence between the second recognized text and the second reverse-translated text.

10. The system according to claim 1, wherein the control unit further comprises a first display decision unit configured to decides whether the second text set is displayed on the first display unit, based on the distance between the first terminal device and the second terminal device.

11. The system according to claim 1, wherein the control unit further comprises a first display decision unit that decides whether the second text set is displayed on the first display unit, based on a readability of the second user being able to read the first display unit.

12. The system according to claim 1, wherein the second terminal device is portable.

13. A computer program product comprising a non-transitory computer readable medium comprising programmed instructions for performing a speech translation processing, comprising:
   a first terminal device comprising a first speech input for inputting a first speech of a first language spoken by a first user, and converting the first speech to a first speech signal;
   a second terminal device comprising a second speech input for inputting a second speech of a second language spoken by a second user, and converting the second speech to a second speech signal;
   a speech recognition device that receives the first speech signal and the second speech signal, recognizes the first speech signal to a first recognized text, and recognizes the second speech signal to a second recognized text;
   a machine translation device that receives the first recognized text and the second recognized text, translates the first recognized text to a first translated text of the second language, and translates the second recognized text to a second translated text of the first language;
   a control device; wherein the first terminal device receives (a) a first text set of the first language being the first recognized text and the second translated text, and (b) a second text set of the second language being the second recognized text and the first translated text, and comprises a first display unit that displays the first text set and the second text set; the second terminal device receives at least one text of the second text set, and comprises a second display unit that displays the at least one text of the second text set;
   a third terminal device comprising a third speech input for inputting a third speech of a third language spoken by a third user, and converting the third speech to a third speech signal;

the speech recognition device receives the third speech signal, and recognizes the third speech signal to a third recognized text;
   the machine translation device receives the third recognized text and the first recognized text, further comprises a third machine translation unit that translates the third recognized text to the third translated text of the first language, and translates the first recognized text to the fourth translated text of the third language;
   the first display unit displays (a) at least one text set of the second text set and a third text set of the third language being the third recognized text and the fourth translated text, and (b) the fourth text set of the first language being the first text set and the third translated text; and
   the third terminal device further comprises the third display unit that displays at least one text of the third text set.

14. A speech translation method comprising:
inputting a first speech of a first language spoken by a first user, and converting the first speech to a first speech signal;
inputting a second speech of a second language spoken by a second user, and converting the second speech to a second speech signal;
receiving the first speech signal and the second speech signal, recognizing the first speech signal to a first recognized text, and recognizing the second speech signal to a second recognized text;
receiving the first recognized text and the second recognized text, translating the first recognized text to a first translated text of the second language, and translating the second recognized text to a second translated text of the first language;
receiving (a) a first text set of the first, language being the first recognized text and the second translated text, and (b) a second text set of the second language being the second recognized text and the first translated text, and displaying the first text set and the second text set;
receiving at least one text of the second text set, and displaying the at least one text of the second text set;
inputting a third speech of a third language spoken by a third user, and converting the third speech to a third speech signal;
receiving the third speech signal, and recognizing the third speech signal to a third recognized text;
the receiving the third recognized text and the first recognized text, further comprises translating the third recognized text to the third translated text of the first language, and translating the first recognized text to the fourth translated text of the third language;
displaying (a) at least one text set of the second text set and a third text set of the third language being the third recognized text and the fourth translated text, and (b) the fourth text set of the first language being the first text set and the third translated text; and
displaying at least one text of the third text set.

* * * * *